United States Patent [19]

Mattheyses

[11] Patent Number: 4,802,090

[45] Date of Patent: Jan. 31, 1989

[54] HISTOGRAMMING OF PIXEL VALUES ON A DISTRIBUTED PROCESSING SYSTEM

[75] Inventor: Robert M. Mattheyses, Schenectady, N.Y.

[73] Assignee: General Electric Company, Schenectady, N.Y.

[21] Appl. No.: 65,997

[22] Filed: Jun. 24, 1987

[51] Int. Cl.⁴ .......................... G06F 1/00; G06F 3/00; G06F 7/00; G06F 9/00
[52] U.S. Cl. .................................... 364/200; 364/300
[58] Field of Search ................ 382/50, 51; 364/200, 364/300

[56] References Cited

U.S. PATENT DOCUMENTS

| | | | |
|---|---|---|---|
| 3,242,466 | 3/1966 | Dirks | 364/900 |
| 3,654,621 | 4/1972 | Bock et al. | 364/200 |
| 4,180,854 | 12/1979 | Walden et al. | 364/200 |
| 4,425,617 | 1/1984 | Sherwood | 364/200 |
| 4,464,732 | 8/1984 | Clark | 364/900 |
| 4,575,798 | 3/1986 | Lindstrom et al. | 364/300 |
| 4,606,002 | 8/1986 | Waisman et al. | 364/200 |
| 4,611,280 | 9/1986 | Linderman | 364/300 |
| 4,630,234 | 12/1986 | Holly | 364/900 |
| 4,633,431 | 12/1986 | Bar | 364/900 |
| 4,739,476 | 4/1988 | Fiduccia | 364/200 |

OTHER PUBLICATIONS

Blasgen et al., "An Encoding Method for Multifield Sorting and Indexing", Communications of the ACM, vol. 20, No. 11, Nov. 1977, pp. 874–878.

U.S. patent application Ser. No. 033,939 filed 4/3/87 entitled "String Partitioning on a Distributed Processing System".

U.S. patent application Ser. No. 044,633 filed 5/1/87 entitled: "String Length Determination on a Distributed Processing System".

"Data Parallel Algorithms" by W. D. Hillis et al., Communications of the ACM, Dec. 1986, vol. 29, No. 12.

Primary Examiner—Theodore M. Blum
Attorney, Agent, or Firm—Paul R. Webb, II; James C. Davis, Jr.

[57] ABSTRACT

A method for histogramming the pixel values of image data elements, on a distributed processing system, is disclosed. First, the data elements are formed into a data string. Next, the data string is partitioned into a plurality of homogeneous filaments each composed only of data elements having the same pixel value. Finally, the number of data elements composing each homogeneous filament is determined, the determined number being the histogram result for the pixel value corresponding to that homogeneous filament.

26 Claims, 18 Drawing Sheets

| PRO-CESSOR | DATA ELEMENTS | PIXEL VALUE |
|---|---|---|
| P0 | 0 | 00 |
| P1 | 0 | 10 |
| P2 | 0 | 10 |
| P3 | 0 | 10 |
| P4 | 0 | 01 |
| P5 | 0 | 11 |
| P6 | 0 | 11 |
| P7 | 0 | 00 |
| P8 | 0 | 10 |
| P9 | 0 | 01 |
| P10 | 0 | 01 |
| P11 | 0 | 11 |
| P12 | 0 | 01 |
| P13 | 0 | 01 |
| P14 | 0 | 01 |
| P15 | 0 | 11 |

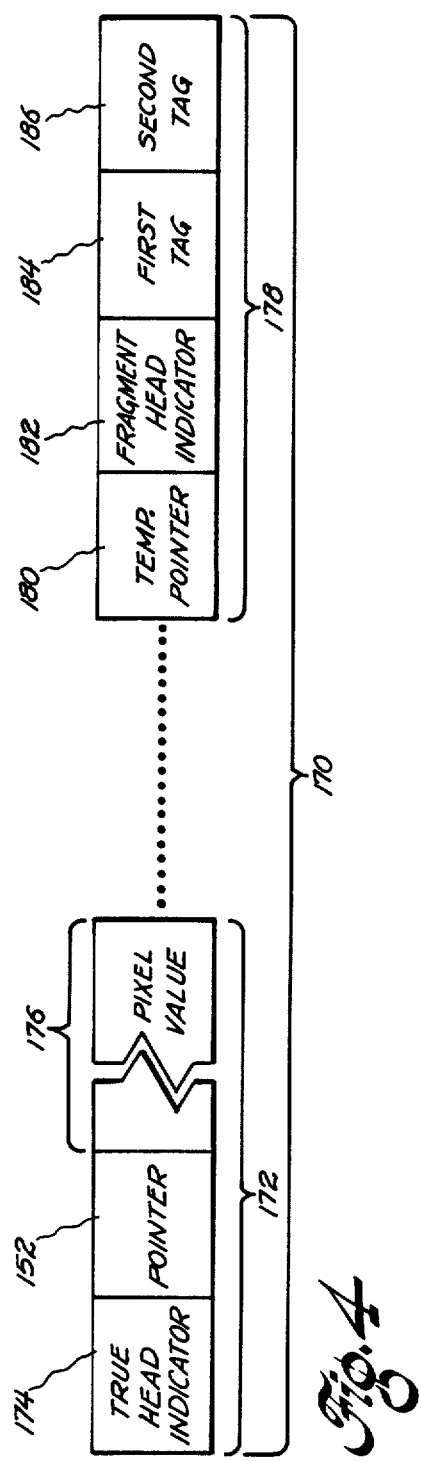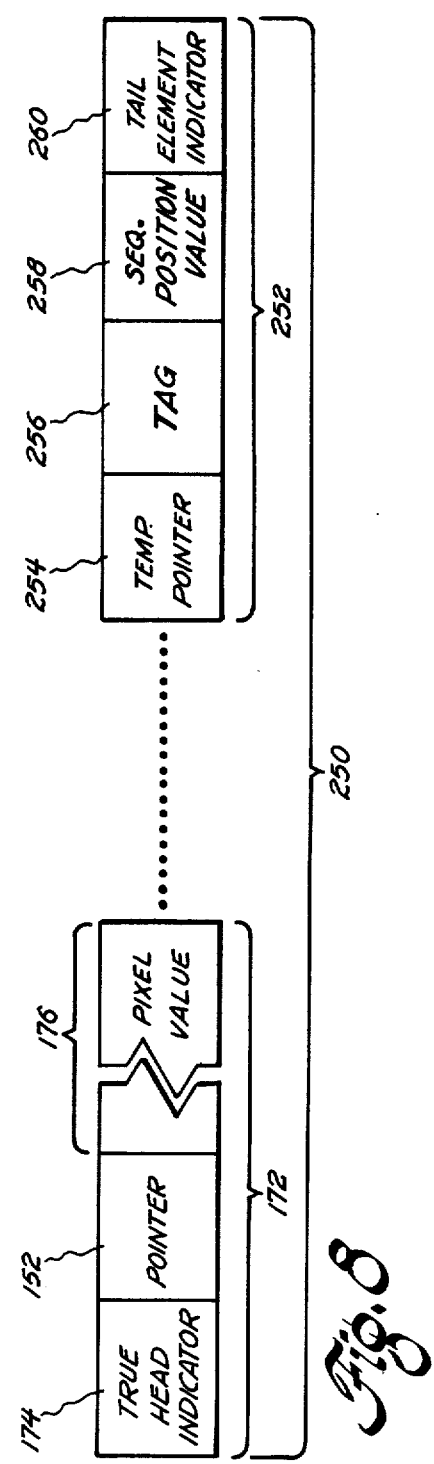

| PROCESSOR | DATA ELEMENTS | PIXEL VALUE 176 | TEMPORARY POINTER 180 | FRAGMENT HEAD INDICATOR 182 | FIRST TAG 184 | SECOND TAG 186 |
|---|---|---|---|---|---|---|
| P0 | 0 | 00 | — | — | — | — |
| P1 | 0 | 10 | P0 | — | — | — |
| P2 | 0 | 10 | P1 | — | — | — |
| P3 | 0 | 10 | P2 | — | — | — |
| P4 | 0 | 01 | P3 | — | — | — |
| P5 | 0 | 11 | P4 | — | — | — |
| P6 | 0 | 11 | P5 | — | — | — |
| P7 | 0 | 00 | P6 | — | — | — |
| P8 | 0 | 10 | P7 | — | — | — |
| P9 | 0 | 01 | P8 | — | — | — |
| P10 | 0 | 01 | P9 | — | — | — |
| P11 | 0 | 11 | P10 | — | — | — |
| P12 | 0 | 01 | P11 | — | — | — |
| P13 | 0 | 01 | P12 | — | — | — |
| P14 | 0 | 01 | P13 | — | — | — |
| P15 | 0 | 11 | P14 | — | — | — |

Fig. 5a

| PROCESSOR | DATA ELEMENTS | PIXEL VALUE 176 | TEMPORARY POINTER 180 | FRAGMENT HEAD INDICATOR 182 | FIRST TAG 184 | SECOND TAG 186 |
|---|---|---|---|---|---|---|
| P0 | 0 | 00 | — | — | S | S |
| P1 | 0 | 10 | P0 | — | — | — |
| P2 | 0 | 10 | P1 | — | — | — |
| P3 | 0 | 10 | P2 | — | — | — |
| P4 | 0 | 01 | P3 | S | S | — |
| P5 | 0 | 11 | P4 | — | — | — |
| P6 | 0 | 11 | P5 | — | — | — |
| P7 | 0 | 00 | P6 | S | S | — |
| P8 | 0 | 10 | P7 | — | — | — |
| P9 | 0 | 01 | P8 | — | S | — |
| P10 | 0 | 01 | P9 | — | — | — |
| P11 | 0 | 11 | P10 | — | — | — |
| P12 | 0 | 01 | P11 | — | — | — |
| P13 | 0 | 01 | P12 | — | — | — |
| P14 | 0 | 01 | P13 | — | — | — |
| P15 | 0 | 11 | P14 | — | — | — |

Fig. 5b

| PROCESSOR | DATA ELEMENTS | PIXEL VALUE 176 | TEMPORARY POINTER 180 | FRAGMENT HEAD INDICATOR 182 | FIRST TAG 184 | SECOND TAG 186 |
|---|---|---|---|---|---|---|
| P0 | 0 | 00 | — | — | S | S |
| P1 | 0 | 10 | P0 | — | S | S |
| P2 | 0 | 10 | P1 | — | — | — |
| P3 | 0 | 10 | P3 | — | — | — |
| P4 | 0 | 01 | P3 | S | S | — |
| P5 | 0 | 11 | P4 | — | S | — |
| P6 | 0 | 11 | P6 | — | — | — |
| P7 | 0 | 00 | P6 | S | S | — |
| P8 | 0 | 10 | P8 | — | S | — |
| P9 | 0 | 01 | P8 | S | S | — |
| P10 | 0 | 01 | P9 | — | — | — |
| P11 | 0 | 11 | P10 | — | — | — |
| P12 | 0 | 01 | P11 | — | — | — |
| P13 | 0 | 01 | P12 | — | — | — |
| P14 | 0 | 01 | P13 | — | — | — |

| PROCESSOR | DATA ELEMENTS | PIXEL VALUE 176 | TEMPORARY POINTER 180 | FRAGMENT HEAD INDICATOR 182 | FIRST TAG 184 | SECOND TAG 186 |
|---|---|---|---|---|---|---|
| P0  | 0 | 00 | — | — | S | S |
| P1  | 0 | 10 | — | — | S | S |
| P2  | 0 | 10 | — | — | S | S |
| P3  | 0 | 10 | P3 | — | S | S |
| P4  | 0 | 01 | P3 | S | S | — |
| P5  | 0 | 11 | P3 | — | S | — |
| P6  | 0 | 11 | P6 | — | S | — |
| P7  | 0 | 00 | P6 | S | S | — |
| P8  | 0 | 10 | P8 | — | S | — |
| P9  | 0 | 01 | P8 | S | S | — |
| P10 | 0 | 11 | P8 | — | S | — |
| P11 | 0 | 01 | P8 | — | S | — |
| P12 | 0 | 01 | P8 | — | S | — |
| P13 | 0 | 01 | P8 | — | S | — |
| P14 | 0 | 01 | P8 | — | S | — |
| P15 | 0 | 11 | P8 | — | S | — |

Fig. 5d

| PROCESSOR | DATA ELEMENTS | PIXEL VALUE 176 | TEMPORARY POINTER 180 | FRAGMENT HEAD INDICATOR 182 | FIRST TAG 184 | SECOND TAG 186 |
|---|---|---|---|---|---|---|
| P0  | 0 | 00 | — | — | S | S |
| P1  | 0 | 10 | — | — | S | S |
| P2  | 0 | 10 | — | — | S | S |
| P3  | 0 | 10 | — | — | S | S |
| P4  | 0 | 01 | P3 | S | S | — |
| P5  | 0 | 11 | P3 | — | S | — |
| P6  | 0 | 11 | P3 | — | S | — |
| P7  | 0 | 00 | P6 | S | S | — |
| P8  | 0 | 10 | P6 | — | S | — |
| P9  | 0 | 01 | P8 | S | S | — |
| P10 | 0 | 11 | P8 | — | S | — |
| P11 | 0 | 01 | P8 | — | S | — |
| P12 | 0 | 01 | P8 | — | — | — |
| P13 | 0 | 01 | P9 | — | — | — |
| P14 | 0 | 01 | P10 | — | — | — |
| P15 | 0 | 11 | P11 | — | — | — |

Fig. 9b

FILAMENT 158

| PROCESSOR | FILAMENT 158 | TEMPORARY POINTER 254 | TAG 256 | SEQUENTIAL POSITION VALUE 258 | TAIL ELEMENT INDICATOR 260 |
|---|---|---|---|---|---|
| P0 | 0 | — | S | 0 | — |
| P7 | 0 | P0 | S | 1 | S |

FILAMENT 160

| PROCESSOR | FILAMENT 160 | TEMPORARY POINTER 254 | TAG 256 | SEQUENTIAL POSITION VALUE 258 | TAIL ELEMENT INDICATOR 260 |
|---|---|---|---|---|---|
| P1 | 0 | — | S | 0 | — |
| P2 | 0 | P1 | S | 1 | — |
| P3 | 0 | P2 | — | — | — |
| P8 | 0 | P3 | — | — | S |

FILAMENT 162

| PROCESSOR | FILAMENT 162 | TEMPORARY POINTER 254 | TAG 256 | SEQUENTIAL POSITION VALUE 258 | TAIL ELEMENT INDICATOR 260 |
|---|---|---|---|---|---|
| P4  | 0 | —   | S | 0 | — |
| P9  | 0 | P4  | S | 1 | — |
| P10 | 0 | P9  | — | — | — |
| P12 | 0 | P10 | — | — | — |
| P13 | 0 | P12 | — | — | — |
| P14 | 0 | P13 | — | — | S |

FILAMENT 164

| PROCESSOR | FILAMENT 164 | TEMPORARY POINTER 254 | TAG 256 | SEQUENTIAL POSITION VALUE 258 | TAIL ELEMENT INDICATOR 260 |
|---|---|---|---|---|---|
| P5  | 0 | —   | S | 0 | — |
| P6  | 0 | P5  | S | 1 | — |
| P11 | 0 | P6  | — | — | — |
| P15 | 0 | P11 | — | — | S |

Fig. 9c

| PROCESSOR | P0 | P7 |
|---|---|---|
| FILAMENT 158 | 0 | 0 |
| TEMPORARY POINTER 254 | — | P0 |
| TAG 256 | S | S |
| SEQUENTIAL POSITION VALUE 258 | 0 | 1 |
| TAIL ELEMENT INDICATOR 260 | — | S |

| PROCESSOR | P1 | P2 | P3 | P8 |
|---|---|---|---|---|
| FILAMENT 160 | 0 | 0 | 0 | 0 |
| TEMPORARY POINTER 254 | — | P1 | P1 | P2 |
| TAG 256 | S | S | — | — |
| SEQUENTIAL POSITION VALUE 258 | 0 | 1 | — | — |
| TAIL ELEMENT INDICATOR 260 | — | — | — | S |

| PROCESSOR | P4 | P9 | P10 | P12 | P13 | P14 |
|---|---|---|---|---|---|---|
| FILAMENT 162 | 0 | 0 | 0 | 0 | 0 | 0 |
| TEMPORARY INDICATOR 254 | — | P4 | P4 | P9 | P10 | P12 |
| TAG 256 | S | S | — | — | — | — |
| SEQUENTIAL POSITION VALUE 258 | 0 | 1 | — | — | — | — |
| TAIL ELEMENT INDICATOR 260 | — | — | — | — | — | S |

| PROCESSOR | P5 | P6 | P11 | P15 |
|---|---|---|---|---|
| FILAMENT 164 | 0 | 0 | 0 | 0 |
| TEMPORARY POINTER 254 | — | P5 | P5 | P6 |
| TAG 256 | S | S | — | — |
| SEQUENTIAL POSITION VALUE 258 | 0 | 1 | — | — |
| TAIL ELEMENT INDICATOR 260 | — | — | — | S |

Fig. 9d

| PROCESSOR | FILAMENT 158 | TEMPORARY POINTER 254 | TAG 256 | SEQUENTIAL POSITION VALUE 258 | TAIL ELEMENT INDICATOR 260 |
|---|---|---|---|---|---|
| P0 | 0 | — | S | 0 | — |
| P7 | 0 | P0 | S | 1 | S |

| PROCESSOR | FILAMENT 160 | TEMPORARY POINTER 254 | TAG 256 | SEQUENTIAL POSITION VALUE 258 | TAIL ELEMENT INDICATOR 260 |
|---|---|---|---|---|---|
| P1 | 0 | — | S | 0 | — |
| P2 | 0 | P1 | S | 1 | — |
| P3 | 0 | P1 | S | 2 | — |
| P8 | 0 | P2 | S | 3 | S |

| PROCESSOR | FILAMENT 162 | TEMPORARY POINTER 254 | TAG 256 | SEQUENTIAL POSITION VALUE 258 | TAIL ELEMENT INDICATOR 260 |
|---|---|---|---|---|---|
| P4 | 0 | — | S | 0 | — |
| P9 | 0 | P4 | S | 1 | — |
| P10 | 0 | P4 | S | 2 | — |
| P12 | 0 | P9 | S | 3 | — |
| P13 | 0 | P10 | — | — | — |
| P14 | 0 | P12 | — | — | S |

| PROCESSOR | FILAMENT 164 | TEMPORARY POINTER 254 | TAG 256 | SEQUENTIAL POSITION VALUE 258 | TAIL ELEMENT INDICATOR 260 |
|---|---|---|---|---|---|
| P5 | 0 | — | S | 0 | — |
| P6 | 0 | P5 | S | 1 | — |
| P11 | 0 | P5 | S | 2 | — |
| P15 | 0 | P6 | S | 3 | S |

Fig. 9e

| PROCESSOR | P0 | P7 | | | | |
|---|---|---|---|---|---|---|
| FILAMENT 158 | 0 | 0 | | | | |
| TEMPORARY POINTER 254 | — | P0 | | | | |
| TAG 256 | S | S | | | | |
| SEQUENTIAL POSITION VALUE 258 | 0 | 1 | | | | |
| TAIL ELEMENT INDICATOR 260 | — | S | | | | |

| PROCESSOR | P1 | P2 | P3 | P8 | | |
|---|---|---|---|---|---|---|
| FILAMENT 160 | 0 | 0 | 0 | 0 | | |
| TEMPORARY POINTER 254 | — | P1 | P1 | P2 | | |
| TAG 256 | S | S | S | S | | |
| SEQUENTIAL POSITION VALUE 258 | 0 | 1 | 2 | 3 | | |
| TAIL ELEMENT INDICATOR 260 | — | — | — | S | | |

| PROCESSOR | P4 | P9 | P10 | P12 | P13 | P14 |
|---|---|---|---|---|---|---|
| FILAMENT 162 | 0 | 0 | 0 | 0 | 0 | 0 |
| TEMPORARY POINTER 254 | — | P4 | P4 | P9 | P4 | P9 |
| TAG 256 | S | S | S | S | — | — |
| SEQUENTIAL POSITION VALUE 258 | 0 | 1 | 2 | 3 | — | — |
| TAIL ELEMENT INDICATOR 260 | — | — | — | — | — | S |

| PROCESSOR | P5 | P6 | P11 | P15 | | |
|---|---|---|---|---|---|---|
| FILAMENT 164 | 0 | 0 | 0 | 0 | | |
| TEMPORARY POINTER 254 | — | P5 | P5 | P6 | | |
| TAG 256 | S | S | S | S | | |
| SEQUENTIAL POSITION VALUE 258 | 0 | 1 | 2 | 3 | | |
| TAIL ELEMENT INDICATOR 260 | — | — | — | S | | |

| | | | | | | |
|---|---|---|---|---|---|---|
| PROCESSOR | P0 | P7 | | | | |
| FILAMENT 158 | 0 | 0 | | | | |
| TEMPORARY POINTER 254 | — | P0 | | | | |
| TAG 256 | 5 | 5 | | | | |
| SEQUENTIAL POSITION VALUE 258 | 0 | 1 | | | | |
| TAIL ELEMENT INDICATOR 260 | — | 5 | | | | |
| PROCESSOR | P1 | P2 | P3 | P8 | | |
| FILAMENT 160 | 0 | 0 | 0 | 0 | | |
| TEMPORARY POINTER 254 | — | P1 | P1 | P2 | | |
| TAG 256 | 5 | 5 | 5 | 5 | | |
| SEQUENTIAL POSITION VALUE 258 | 0 | 1 | 2 | 3 | | |
| TAIL ELEMENT INDICATOR 260 | — | — | — | 5 | | |
| PROCESSOR | P4 | P9 | P10 | P12 | P13 | P14 |
| FILAMENT 162 | 0 | 0 | 0 | 0 | 0 | 0 |
| TEMPORARY POINTER 254 | — | P4 | P4 | P9 | P4 | P9 |
| TAG 256 | 5 | 5 | 5 | 5 | 5 | 5 |
| SEQUENTIAL POSITION VALUE 258 | 0 | 1 | 2 | 3 | 4 | 5 |
| TAIL ELEMENT INDICATOR 260 | — | — | — | — | — | 5 |
| PROCESSOR | P5 | P6 | P11 | P15 | | |
| FILAMENT 164 | 0 | 0 | 0 | 0 | | |
| TEMPORARY POINTER 254 | — | P5 | P5 | P6 | | |
| TAG 256 | 5 | 5 | 5 | 5 | | |
| SEQUENTIAL POSITION VALUE 258 | 0 | 1 | 2 | 3 | | |
| TAIL ELEMENT INDICATOR 260 | — | — | — | 5 | | |

Fig. 9f

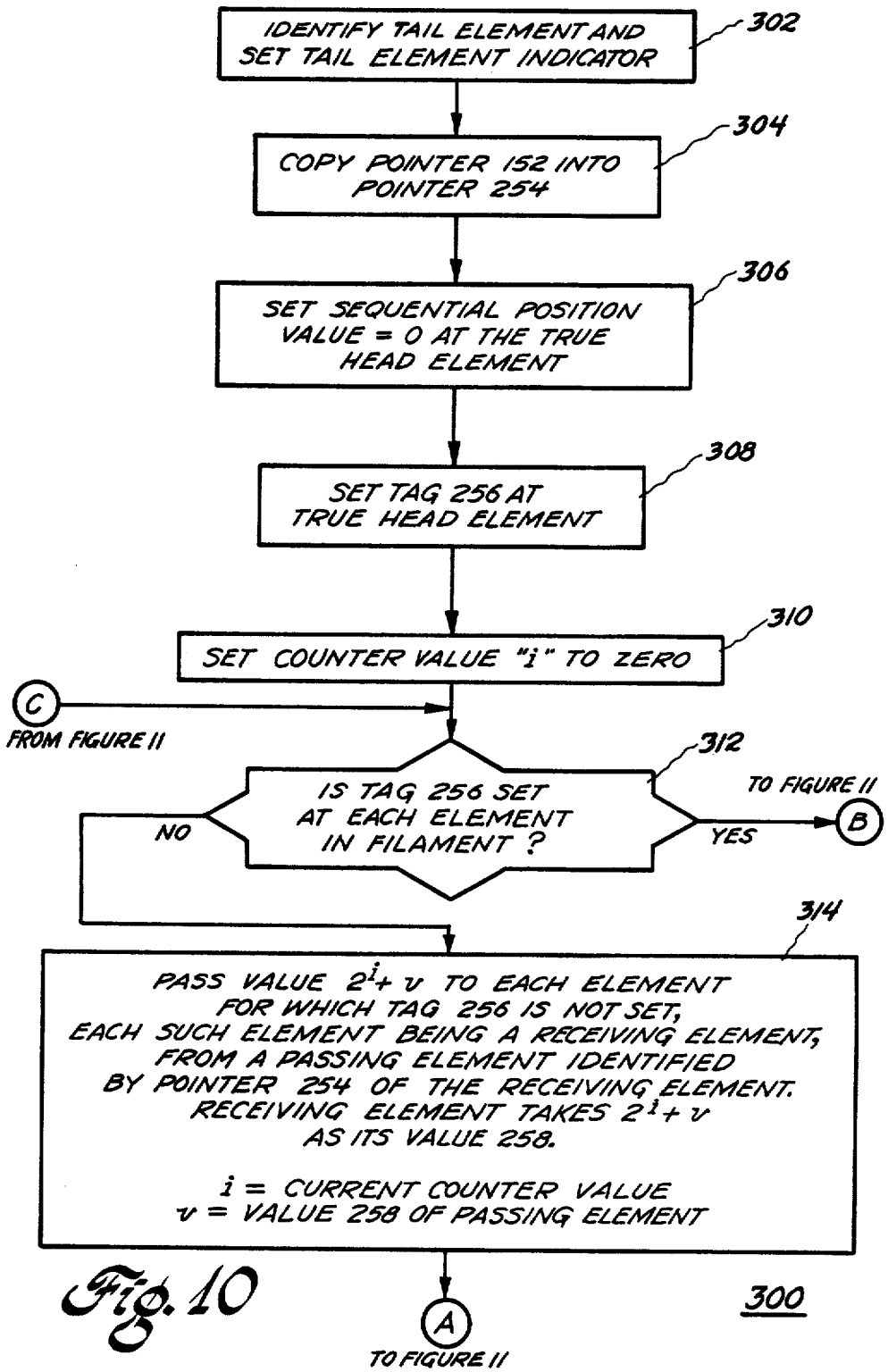

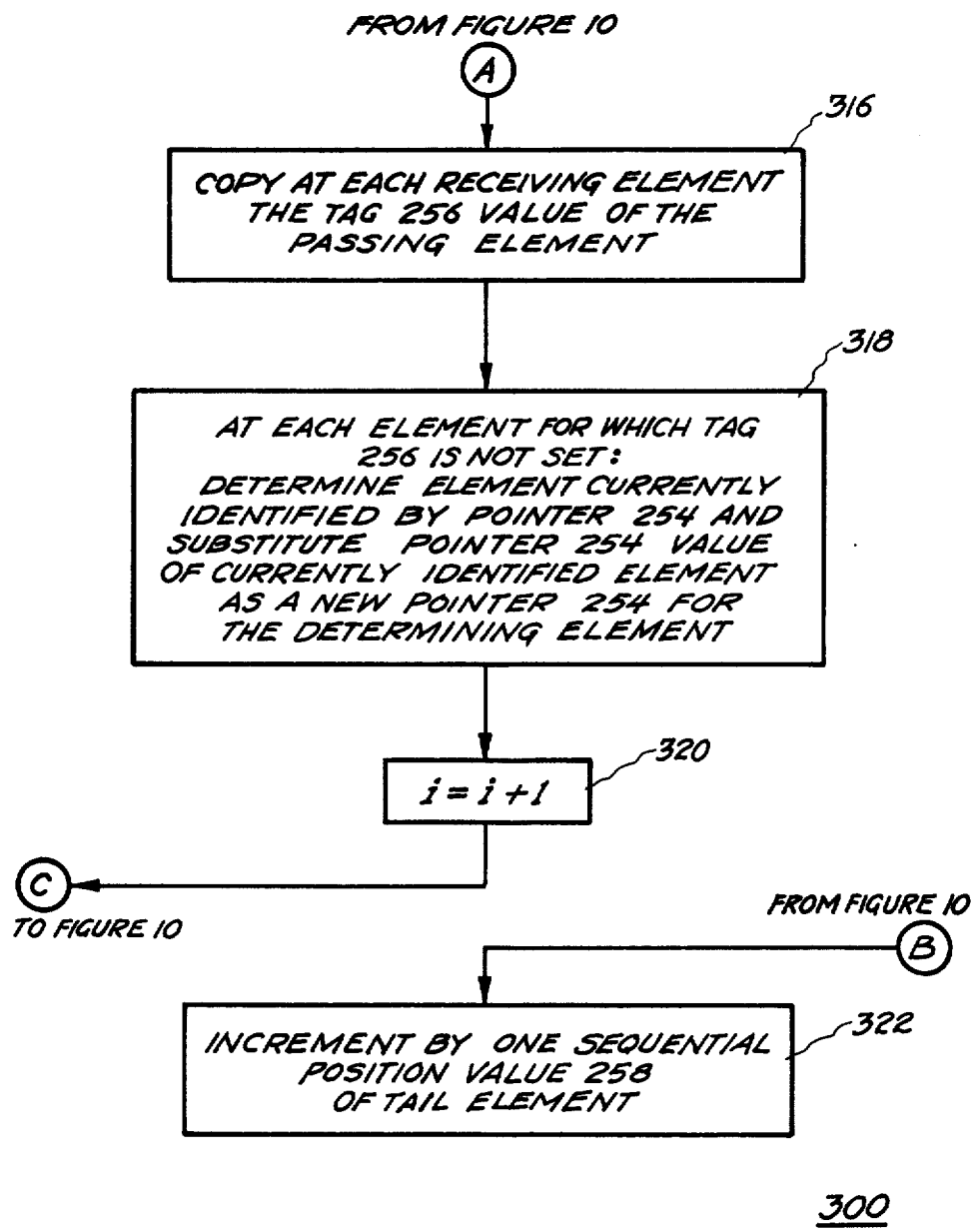

HISTOGRAMMING OF PIXEL VALUES ON A DISTRIBUTED PROCESSING SYSTEM

RELATED U.S. PATENT APPLICATIONS

This application is related to commonly assigned U.S. patent applications Ser. No. 33,939 filed 4/3/87 and Ser. No. 44,633, both filed in the name of Robert M. Mattheyses and entitled "String Partitioning on a Distributed Processing System" and "String Length Determination on a Distributed Processing System", respectively.

BACKGROUND OF THE INVENTION

The present invention is directed in general to computation methods for practice on distributed processing systems, and, more specifically, to a method for histogramming of pixel values on a distributed processing system. Distributed processing system is used herein to describe a system in which a plurality of independent, interconnected, arithmetical-logical processor elements operate in parallel to form a multiplicity of processing functions. The processors of the system are, typically, substantially identical to one another. The processors are preferably interconnected in a manner enabling communication between any pair of processors. In one type of parallel processing system known in the art as a single instruction multiple data (SIMD) system, a single sequence of instructions is provided to all processors. That is, all processors simultaneously perform operations in accordance with the same sequence of instructions. However, each processor may be performing the operations dictated by the instructions on different sets of data.

The individual processors of a SIMD parallel processing system typically have dedicated memory which may be loaded with data on which instructed operations can be performed. Also, each processor can read and write information at another processor. Thus, there is a flexibility in the operations performed by each processor insofar as derives from varying the data upon which each processor operates.

Various types of computations are well suited for processing on a distributed processing system. Generally, image processing problems represent one class of computations especially well suited for such processing. This is in part because of the usually large amount of data that requires processing. The image data requiring processing is typically composed of data elements each including a picture element (pixel) value. Each pixel value may comprise one or more data fields representing gray shade or color value. By processing such image data on a distributed processing system, computational operations may be performed in parallel on all of the data elements. The overall speed with which the computation proceeds is thereby enhanced.

As is known in the art, some image processing operations, such as image enhancement, include as an early step the histogramming of pixel values. Histogramming as used herein is simply the counting of the number of times each different pixel value occurs. There exists a need for a method by which to efficiently compute such histograms of pixel values on a distributed processing system.

It is therefore a principal object of the present invention to provide an efficient method for the histogramming of pixel values on a distributed processing system.

SUMMARY OF THE INVENTION

In accordance with the present invention there is provided a method for determining, on a distributed processing system, a number of times each of a plurality of different element values occurs in a group of data elements. Each data element includes one element value. Such a determination is effectively a histogramming of the data element values. The processing system comprises a plurality of processors intercoupled to communicate with one another. Each processor comprises processing means for performing arithmetic and logic functions and memory means for storing information. The distributed processing system is responsive to a single sequence of instructions applied in parallel to all of the processors. Each data element is stored in the memory means of a different one of the processors in the distributed processing system.

The method of the present invention commences with the forming of the group of data elements into a data string in which each data element includes a first pointer identifying an immediately preceding element closer to a true head element of the string. Next, the data string is partitioned into a plurality of homogeneous filaments each composed only of data elements having the same element value. As a result, there is only one of the different element values corresponding to each homogeneous filament. As a final step, the numbers of data elements respectively composing, i.e. the respective lengths of, the homogeneous filaments are concurrently determined. The number of data elements so determined for each homogeneous filament is the number of times the element value corresponding to that homogeneous filament occurs.

In order to perform the partitioning step, it is noted that each element value of each data element is expressed in binary form with the same bit length. A true head indicator is set at the true head element of the data string. The partitioning step comprises a plurality of substeps commencing with the step of specifying a predetermined one of the element value bits as a partitioning bit. The data string is referred to hereinafter as an original string for purposes of the partitioning step. The original string is composed of at least one string fragment where each such fragment is composed of a maximal continuous sequence of data elements having the same value of the partitioning bit. Next, the value of the first pointer is copied into a second pointer at all data elements. Following this step, a determination is made for all data elements, except the true head element, as to whether the immediately preceding element in the data string has the same value of the partitioning bit as the data element for which the determination is being made. A first tag is set at all data elements for which it is determined that the immediately preceding element does not have the same partitioning bit value as itself. Each data element having its first tag so set is a fragment head element.

The partitioning method continues with a step in which the first tag and a second tag are set only at the true head element. Each data element that has its first tag set or not set is respectively referred to as a tagged or untagged element. In the next step, the processor for each untagged element gets, by reading, the values of the first and second tags and the second pointer from the data element currently identified by the second pointer of the untagged element. Then, the processor for each untagged element substitutes the values of the first and second tags and the second pointer obtained from the currently identified element respectively for the first and second tags and second pointer of the untagged element. These getting and substituting steps are repeated until all of the data elements in the original string are tagged. Next, the true head indicator is set at each fragment head element for which it is determined that the second tag is set at the immediately preceding element in the original string. Following this step, the processor for each fragment head element gets the value of the second pointer of the immediately preceding element in the original string and substitutes the last recited second pointer value for the value of the first pointer of the fragment head element stored thereby. As a result, two filaments are formed, each defined by the first pointer at each data element and the true head indicator being set at the data element at the head of each filament. Then, a different one of the bits of the element value is specified as the partitioning bit and the sequence of steps commencing with the step in which the first pointer is copied into the second pointer, are repeated. The repetition of these steps is carried out with each filament formed in the previous performance of the steps being the original string. The partitioning step is complete when all bits of the element value have been specified as the partitioning bit, whereupon each filament formed is homogeneous.

The step of determining the number of data elements composing each homogeneous filament comprises three basic substeps. First, a tail element of each homogeneous filament is identified. Second, a sequential position value is assigned to each data element in each homogeneous filament. The true head element of each homogeneous filament is assigned the sequential position value of '0' and the sequential position value of each data element exceeds by '1' the sequential position value of the data element identified by its first pointer. In the third and final step, the sequential position value of each tail element is incremented by '1', the incremented position value of each tail element being the number of data elements composing the homogeneous filament with which the tail element is associated.

Having described the basic substeps of determining the number of data elements composing each homogeneous filament, the detailed substeps of this determination are described. These detailed substeps commence with a step in which a tail element of each homogeneous filament is identified. Next, the first pointer at each data element is copied into the second pointer. Following this step, a sequential position value of '0' is defined at each true head element. Next, a tag (different from the first and second tags described above) is set at the true head element. A counter value is then set to '0'. It is next determined if the tag is set at each data element in each homogeneous filament and, if so, an incrementing step (described below) is proceeded to. If not, a value $2^i+v$ is taken as a sequential position value of each data element for which the tag is not set, each of the last recited data elements being a receiving element, where:

i = the current counter value; and
v = the sequential position value of a passing element identified by the second pointer of the receiving element.

Next, the tag of each passing element is copied at each receiving element. Then, the processor for each data element for which the tag is not set determines which data element is currently identified by the second pointer of its untagged element and substitutes the second pointer of the currently identified data element for the second pointer of its untagged element. Following this step, the counter value is incremented by '1' and the method returns to the step in which it is determined if the tag is set at each data element in each homogeneous filament. If the incrementing step is proceeded to in the last recited determining step, the sequential position value of each filament tail element is incremented by '1'. The incremented position value of each tail element is the number of data elements composing the homogeneous filament with which the tail element is associated.

In a final step of the histogramming method, the incremented position value at each tail element is respectively transferred to the processor in the distributed processing system having a numerical address identity equal to the element value of the tail element from which the incremented value is transferred.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which:

FIG. 4 illustrates a data structure, for a data element, preferred for the practice of the partitioning step of the inventive histogramming method;

FIGS. 5a, 5b, 5c, 5d and 5e illustrate the results of the successive steps of partitioning the exemplary data string as illustrated in FIGS. 2a, 2b, 2c and 2d;

FIG. 8 illustrates a data structure, for a data element, preferred for the practice of a filament length determination step of the histogramming method of the present invention;

FIGS. 9a, 9b, 9c, 9d, 9e and 9f illustrate the results of performing the successive steps to determine the respective lengths of homogeneous filaments formed by partitioning the exemplary data string; and FIGS. 10 and 11 illustrate, in flowchart form, the steps required for filament length determination, as taught hereinbelow.

DESCRIPTION OF THE INVENTION

Figure 1:
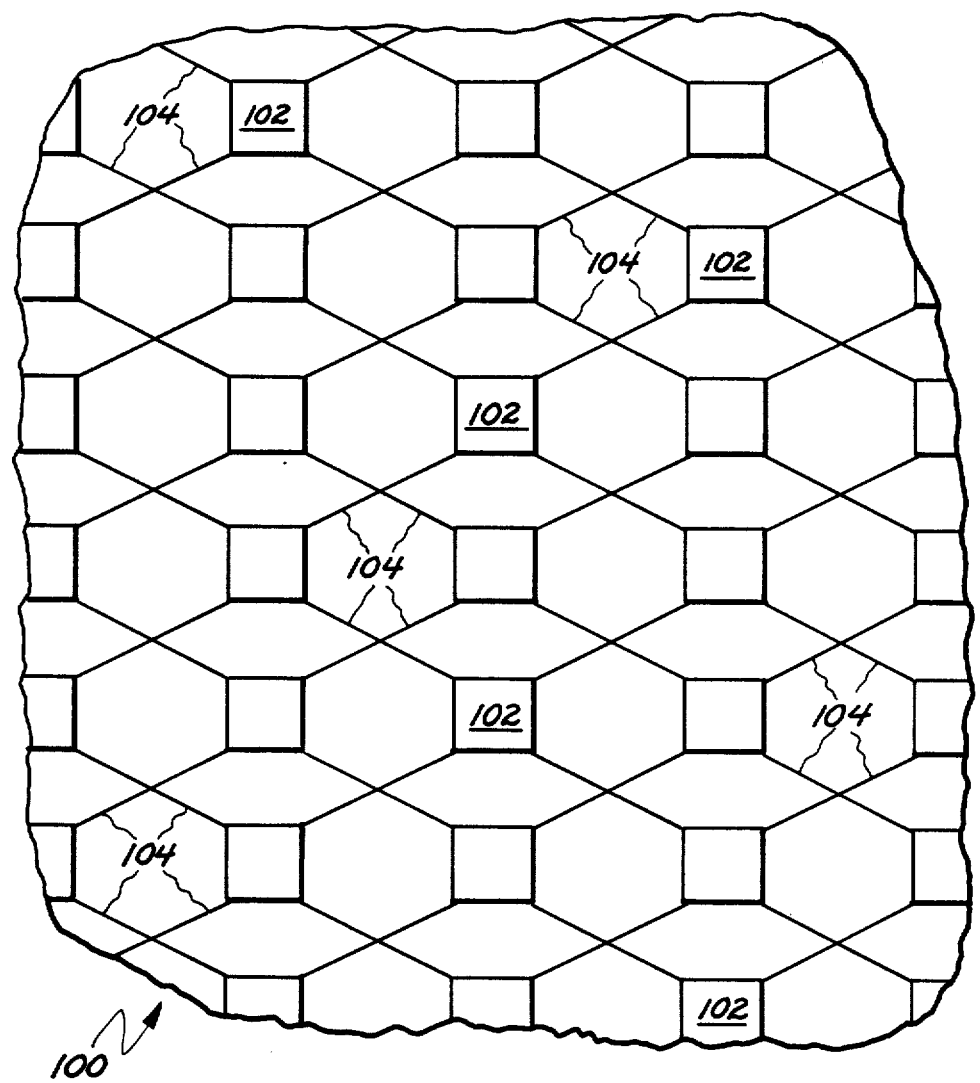
FIG. 1 illustrates an exemplary distributed processing system on which the histogramming method of the present invention may be practiced.

Referring now to the drawings, FIG. 1 illustrates an exemplary distributed processing system 100 on which the method of the present invention may be practiced. System 100 comprises a plurality of processors 102 which are locally interconnected through connections 104. Processors 102 are further interconnected by means of a communication network, not shown, that enables any processor 102 in system 100 to communicate with any other processor in the system. Communication between processors is used herein to refer to both the reading and writing by one processor of information at another processor. Such a communication network may simply comprise a cross bar network, well known in the art, in which every processor is connectable to every other processor through a controllable switch. More sophisticated communication networks such as self-routing networks, known in the art, may instead by used to enable more efficient communication between the processors. Each processor includes processing means (not shown), such as a microprocessor, for manipulating data to perform arithmetic and logic operations. Each processor further includes dedicated memory (not shown) which is used, inter alia, for the storage of data upon which the processing means performs operations. Distributed processing systems of the type that may be used in practicing the method of the present invention are described in detail in "The Connection Machine" by W. D. Hillis, the MIT Press, 1985.

It is intended for the practice of the present invention that system 100 be of the SIMD type. That is, it is intended that a single set of instructions be applied in parallel to all processors 102 in system 100. The means by which programmed instructions are converted to a suitable coded form and applied in parallel to the elements of the distributed processing system are well known in the art and are therefore not described in detail herein. It is noted that while the same instruction is applied to all processors, the instruction may include conditions which limit its actual performance to selected processors in the system. Thus, each processor evaluates the condition and on the basis of the evaluation result, determines whether or not to perform the instruction.

Figures 2A, 2B:
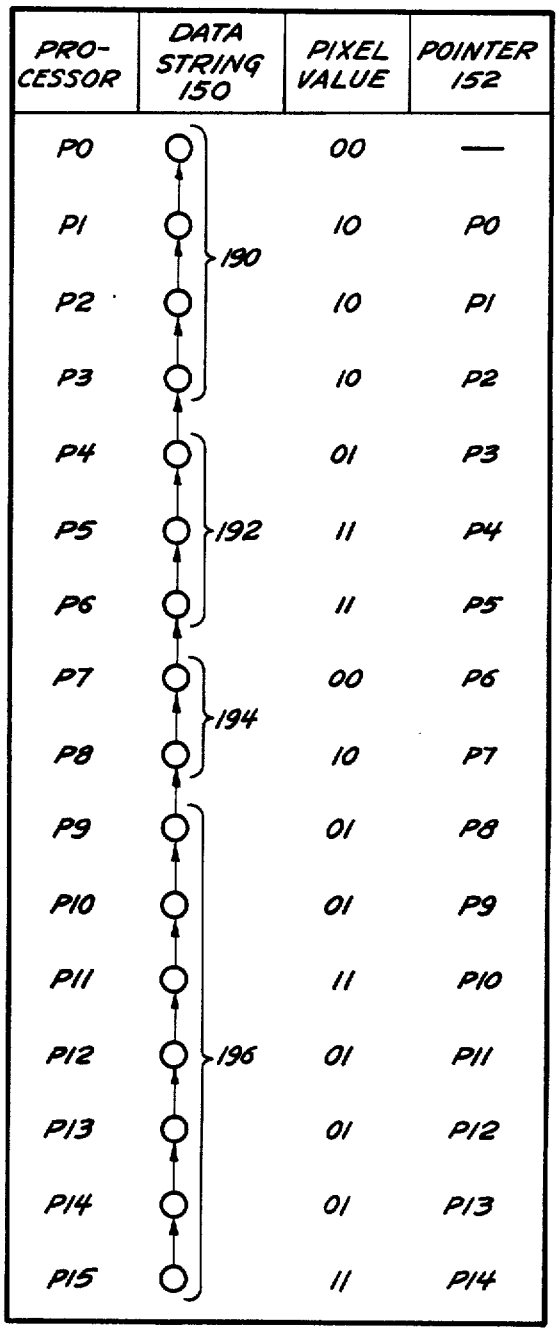
FIGS. 2a, 2b, 2c and 2d illustrate the successive steps of partitioning an exemplary data string in accordance with a step of the histogramming method taught hereinbelow.

The present invention provides an efficient method for the histogramming of pixel values on a distributed processing system. As stated above, the histogramming of pixel values is simply a determination of the number of times each different pixel value occurs. FIG. 2a illustrates an exemplary group of sixteen data elements representing image data, each element being represented as a small circle, on which an illustrated embodiment of the histogramming method of the present invention is practiced hereinbelow. A pixel value expressed in binary form for each data element is indicated to the right thereof in FIG. 2a.

Figure 3:
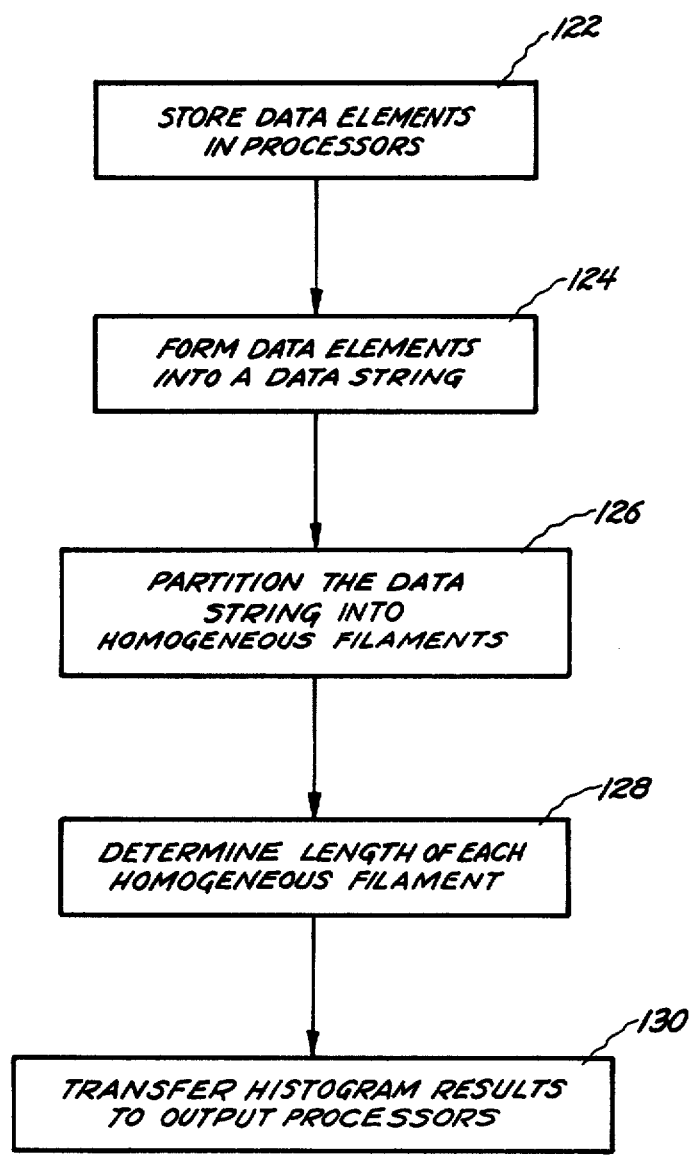
FIG. 3 illustrates the histogramming method of the present invention in flowchart form.

FIG. 3 illustrates a flowchart 120 which provides an overview of the method of the present invention. Flowchart 120 commences with a step 122 in which each data element is stored in the memory of a different processor of the distributed processing system. It is therefore implicit that the number of data elements is less than or equal to the number of processors. It is characteristic of distributed processing systems that each processor has a unique address identity known to itself. For example, in a processing system comprising N processors, the processor addresses may range sequentially from 0 to N−1. In such a case, where there are d data elements and d≦N, these elements would preferably be stored in the sequence of processors having the respective address identities 0 through d−1. The notation P# is used hereinbelow to identify the processor having address identity #. The address identity #'s are used by the communication network apparatus to identify the respective processors between which information is being transmitted. The address identity #'s also facilitate description of the processors and their respective addresses. Thus, the sixteen data elements illustrated in FIG. 2a would be stored at the sequence of processors P0 through P15. As an indication of the performance of step 122, the identity of the processor in which each data element is stored is indicated to the left thereof in FIG. 2a.

Referring again to flowchart 120, at a next step 124, the data elements are linked together to form a data string. Characteristic of such a data string, as is known in the art, each data element includes means such as a pointer for identifying a next, preceding element in the string closer to a true head element of the string. The string structure is illustrated in FIG. 2b wherein the data elements shown in FIG. 2a are formed into a data string 150 with each element being provided with a pointer diagrammatically identifying, i.e. pointing to, the preceding element in the string. In practicing the method of the present invention on a distributed processing system, the string structure is constructed in the respective memories of the processors. An instruction is applied in parallel to all processors to compute the address of the preceding processor by subtracting one from its own address. For example, processor P5 by subtraction computes that the address identity of the preceding processor is P4. The computed preceding address identity is stored in the memory at each processor as a pointer 152 for the data element stored at that processor. In this sense, each data element via its processor carries the identity of the next element (i.e. processor address at which the next element is located) in the data string. The value of each pointer 152 is listed adjacent the pixel value for each data element, in FIG. 2b. Note that the pointers impart a directionality to data string 150 such that the data element stored at processor P0 is the true head element of the string. Similarly, the element at processor P15 is a tail element of string 150.

Figure 2C:
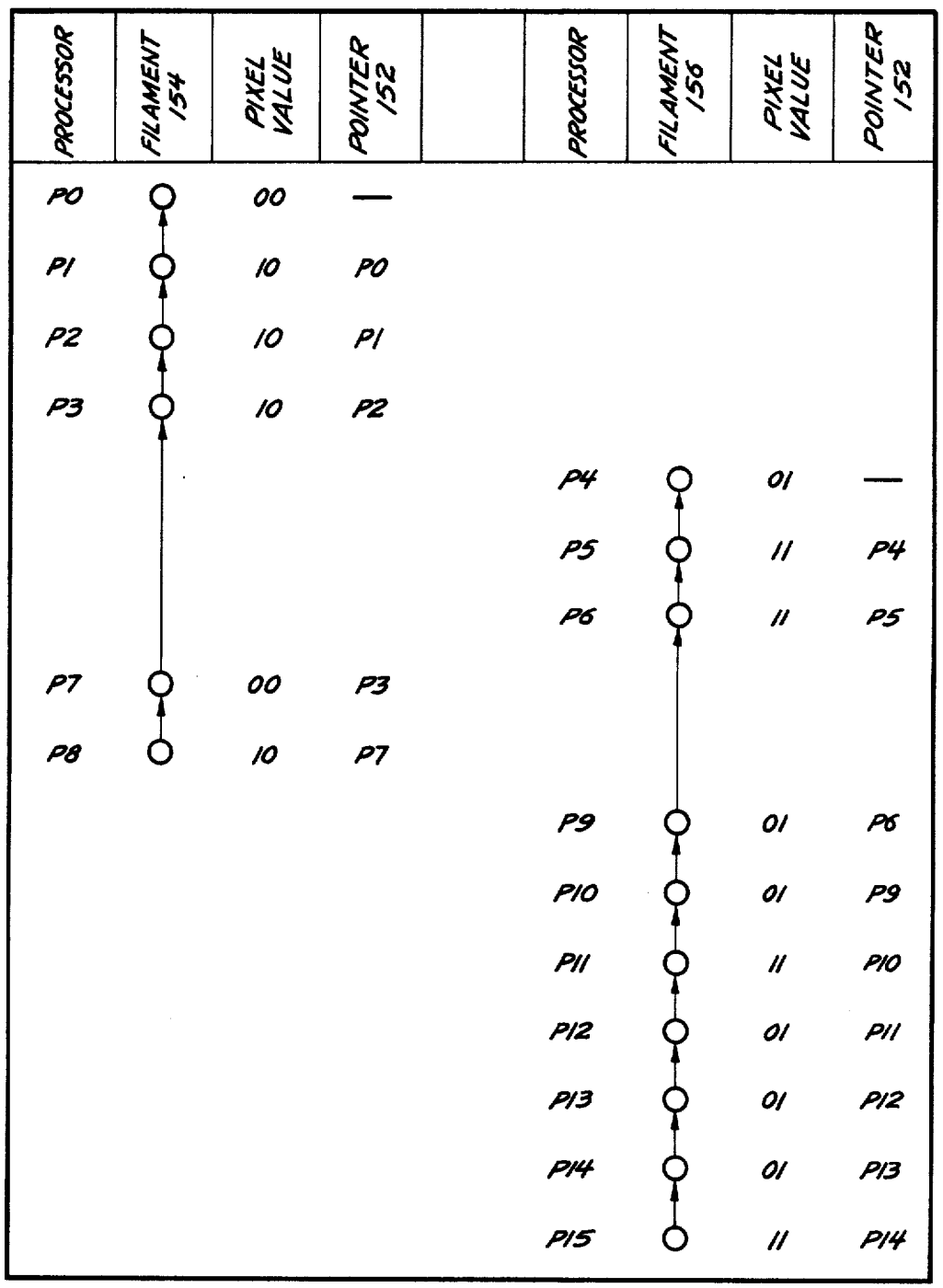

Continuing with flowchart 120, at a step 126, the data string formed in step 124 is partitioned into a plurality of homogeneous filaments. Each homogeneous filament is composed of all elements from the data string which have the same pixel value. Partitioning, as is illustrated and described in greater detail hereinbelow, proceeds as a series of partitioning substeps on the successive bits of the pixel value. In the illustrated embodiment, two such partitioning substeps are required. For the first partitioning substep, data string 150 is partitioned on the least significant bit (1 sb) of the pixel value into two filaments. This result is illustrated in FIG. 2c wherein one filament 154 is composed of all elements for which the 1 sb of the pixel value is '0'. A second filament 156 resulting from the first partitioning substep is composed of all elements for which the 1 sb is '1'. The bit of the pixel value on which partitioning proceeds is referred to herein as a partitioning bit. The processor address and pixel value are still indicated adjacent each element in FIG. 2c. Note that partitioning is effected by changing pointer 152 values at selected elements. Thus, for example in FIG. 2c for filament 154, pointer 152 of the element at processor P7, which previously identified processor P6, now identifies processor P3. Similarly, the pointer 152 value of processor P4 is blank, since that element is at the head of filament 156. The detailed steps for determining and effecting the requisite pointer value changes are described more fully below. It is noted that after the first partitioning substep, the resulting filaments 154, 16 are not homogeneous, i.e. the pixel values of all elements in each filament are not identical.

Figure 2D:
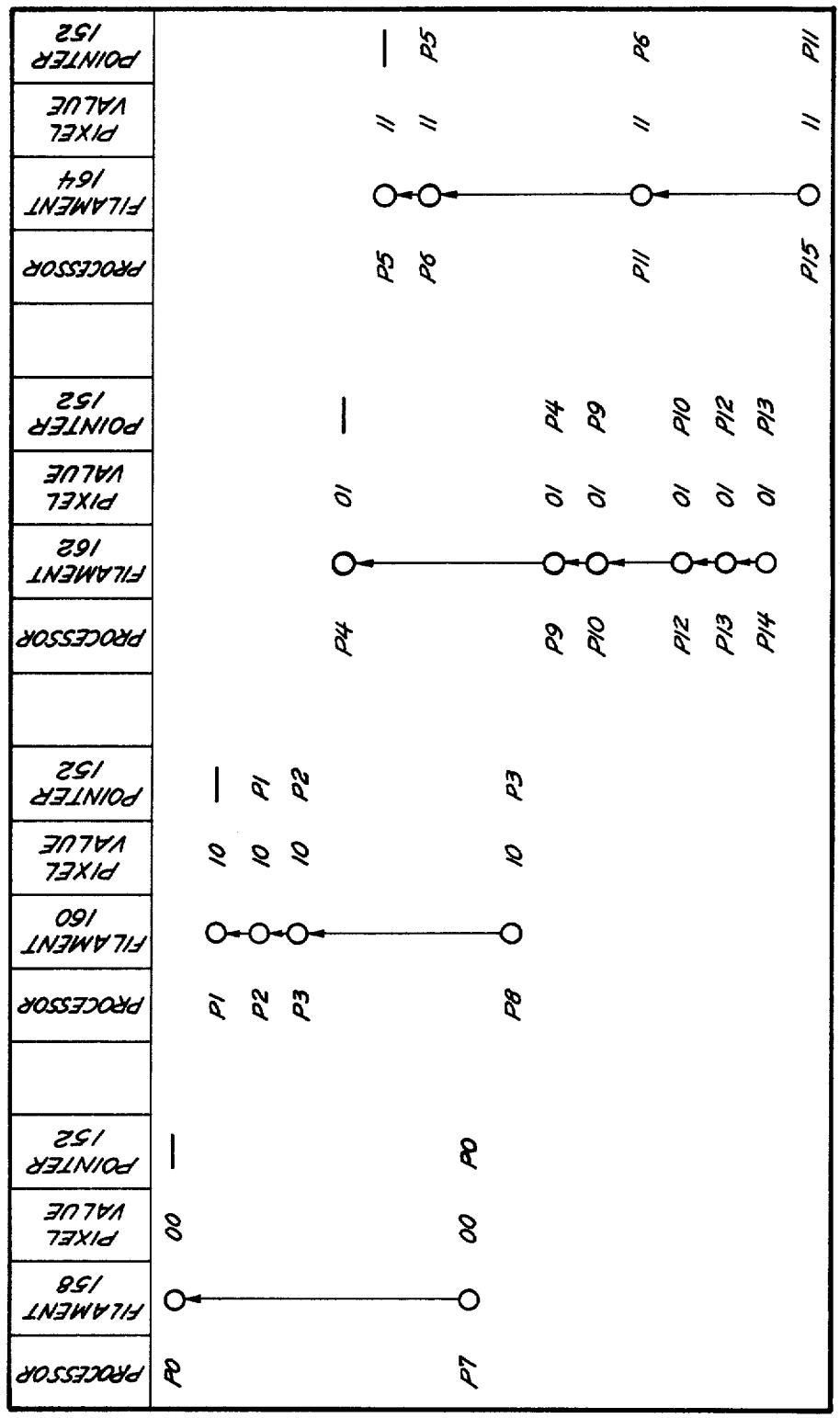

For the second partitioning substep, the filaments resulting from the previous partitioning substep are partitioned in parallel, and therefore concurrently, on the next more significant bit, which in the case of the illustrated embodiment is the most significant bit (msb)

of the two bit pixel value. This result is illustrated in FIG. 2d in which filament 154 has been partitioned into two homogeneous filaments 158 and 160 respectively composed of elements having only pixel values '00' and '10'. Similarly, filament 156 has been partitioned into two homogeneous filaments 162 and 164 respectively composed only of elements with pixel values of '01' and '11'. As in the case of the first partitioning substep, partitioning into filaments 158, 160, 162, and 164 is effected by changing the pointer 152 values at the appropriate elements. For example, pointers 152 for the data elements at processors P1 and P5 have been changed to blanks since each such element is a filament head element, i.e. is at the head of a filament. Also, pointer 152 of the element at processor P11 which previously identified processor P10 now identifies processor P6.

Thus, in a main computer program for the practice of the histogramming method of the present invention, the partitioning method can be viewed as a subprogram called by the main program to partition the data string. It is a requirement herein that all pixel values be of equal bit length. Where this requirement is not met by the pixel values as initially received for processing, pixel values of insufficient bit length may be padded with '0' or '1' bits to achieve the required length. Then, when the partitioning subprogram is called, the position within the pixel value of the partitioning bit upon which the data string(s) or filaments are to be partitioned is specified by the main program. The partitioning subprogram would therefore be successively called, each time with a different bit of the pixel value specified as the partitioning bit. It is noted that the bits of the pixel value need be specified as partitioning bits in no particular order. However, in the illustrated embodiment, the 1 sb is specified first as the partitioning bit and then the next more significant bit is specified.

Referring again to FIG. 3 and flowchart 120, the method next proceeds to a step 128 in which the length of, i.e. the number of elements in, each homogeneous filament is determined in parallel, and thus concurrently, for all such filaments. Since each homogeneous filament is composed of all elements having the same pixel value from the original group of data elements received for processing, the filament length is the histogram result for the pixel value corresponding to that filament. Thus, the number of elements composing each filament 158, 160, 162 and 164 are respectively the histogram results for pixel values '00', '10', '01' and '11'. As can be seen in FIG. 2d, there are respectively 2,4,6, and 4 elements having pixel values '00', '10', '01' and '11'. The detailed method for determining the filament lengths is described in detail below. It is noted that the length determination method can also be viewed as a subprogram called by the main histogramming program upon completion of the string partitioning step. The length determination method results in each filament length being stored at the processor of the tail element of the respective filament. As a final step 130 of the present method, those filament length values, i.e. the histogram results, are transferred from the respective filament tail element processors to output processors. The address of each output processor is equal to the pixel value for which it is to carry the histogram result. Since the processor for each tail element holding such a result also has the same pixel value, each such tail element processor knows the address of the appropriate output processor to which to transfer the histogram result.

The detailed steps by which string partitioning is accomplished are described next. A data structure 170 for each data element is illustrated in FIG. 4. Structure 170 includes a permanent portion 172 that represents the different data fields comprising each data element as it would be stored in its corresponding processor memory. Portion 172 includes a true head indicator 174 which indicates if the particular element is located at the true head of the data string or filament of which it is a part. Portion 172 further includes pointer 152 described above for identifying the next, preceding element in the string closer to the true head element thereof. Additionally, portion 172 includes a pixel value field 176 which contains the pixel value, i.e. gray shade or color data, of the particular data element. In the case where the data elements comprising the image data being processed each include more than one type of pixel value, pixel value field 176 is understood to carry the particular pixel value on which the histogramming is being performed. As noted above, for the purpose of practicing the partitioning method described herein, the pixel value fields of the data elements comprising the image data are of equal bit length.

In practicing the partitioning method described herein, it is necessary to provide an additional data portion 178 at each processor for each element. The additional data portion "shadows" or "parallels" data portion 172 and its content is determined by the practice of the partitioning method. Portion 178 includes a temporary pointer 180 for carrying an element identity determined by the partitioning method. Portion 178 further includes a fragment head element indicator 182 which when set, indicates that the element it is associated with is the head element of a fragment. A fragment as used herein is a maximal continuous sequence of elements, in a string or filament, having the same bit value of the partitioning bit on which the particular string or filament is being partitioned. For example, referring again to FIG. 2b, with respect to the 1 sb, data string 150 is composed of four fragments 190, 192, 194 and 196. Specifically, fragment 190 is composed of the continuous sequence of elements at processors P0 through P3 for which 1 sb=0; fragment 192 is composed of the continuous sequence of elements at processors P4 through P6 for which 1 sb=1; fragment 194 is composed of the element sequence at processors P7 and P8 for which 1 sb=0; and fragment 196 is composed of the continuous element sequence at processors P9 through P15 for which 1 sb=0. As can be seen, a property of each fragment is that the fragments immediately adjacent thereto are composed of elements having a different value of the partitioning bit than that fragment. The significance of identifying fragments in the context of the partitioning method is described more fully below.

Additional data portion 178 also includes a first tag 184 and a second tag 186. Tags 184 and 186 are in an unset condition at the commencement of partitioning. In the course of partitioning, one or both of tags 184, 186 or the two head indicators 174, 182 may be set. The status as to whether indicators 174 or 182 or tags 184 or 186 are unset or set is determined by whether an indicator or tag carries a first or second predetermined bit value. For example, the unset or set condition may be respectively indicated by the presence of a '0' or '1' bit.

With respect to the individual fields of data portions 172 and 178 of data structure 170, it is preferred herein that these fields be aligned in the respective processor memories. That is, each field of portions 172 and 178 is at the same memory address location in every processor memory. Such alignment in memory is necessary because of the SIMD format preferred herein. As a result, a single instruction applied to all processors can initiate an operation by each processor on the data at the same memory address location.

Referring again to FIG. 2b, it is noted that each fragment can be viewed as having a fragment head element and a fragment tail element. For example with respect to fragment 192, the head and tail elements are respectively stored at processors P4 and P6. Referring to FIG. 2c, it is seen that each of the two filaments 154, 156 into which string 150 is partitioned, can be viewed as being composed of fragments of string 150. Thus, filament 154 is composed of fragments 190 and 194 and filament 156 is composed of fragments 192 and 196. A distinctive characteristic of each filament 154, 156 is that each fragment head element, except those that are also filament head elements, includes a pointer identifying the tail element of the next fragment in string 150 both closer to the true head element and having elements with the same value of the partitioning bit, here the 1 sb. For example with respect to filament 154, pointer 152 of the element at processor P7 which is the head element of fragment 194, identifies the element at processor P3 which is the tail element of fragment 190. Relative to the element at processor P7, fragment 190 is the next fragment in string 150 that is both closer to the true head element and composed of elements having the same value of the partitioning bit as the element at processor P7. Similarly, with respect to filament 156, pointer 152 of the element at processor P9, at the head of fragment 196, identifies the element at processor P6 which is at the tail of fragment 192. Thus, in general, the partitioning method disclosed herein accomplishes the partitioning of a data string, or filament, by first dividing the string into fragments according to the partitioning bit value carried by each element. Then each fragment head element is provided with a pointer to the tail element of the next fragment in the string that is both closer to the true head element and composed of elements having the same value of the partitioning bit as the fragment head element. Of course, the fragment head elements that become the head elements of the filaments formed by partitioning are not provided with such pointers.

Figure 6:
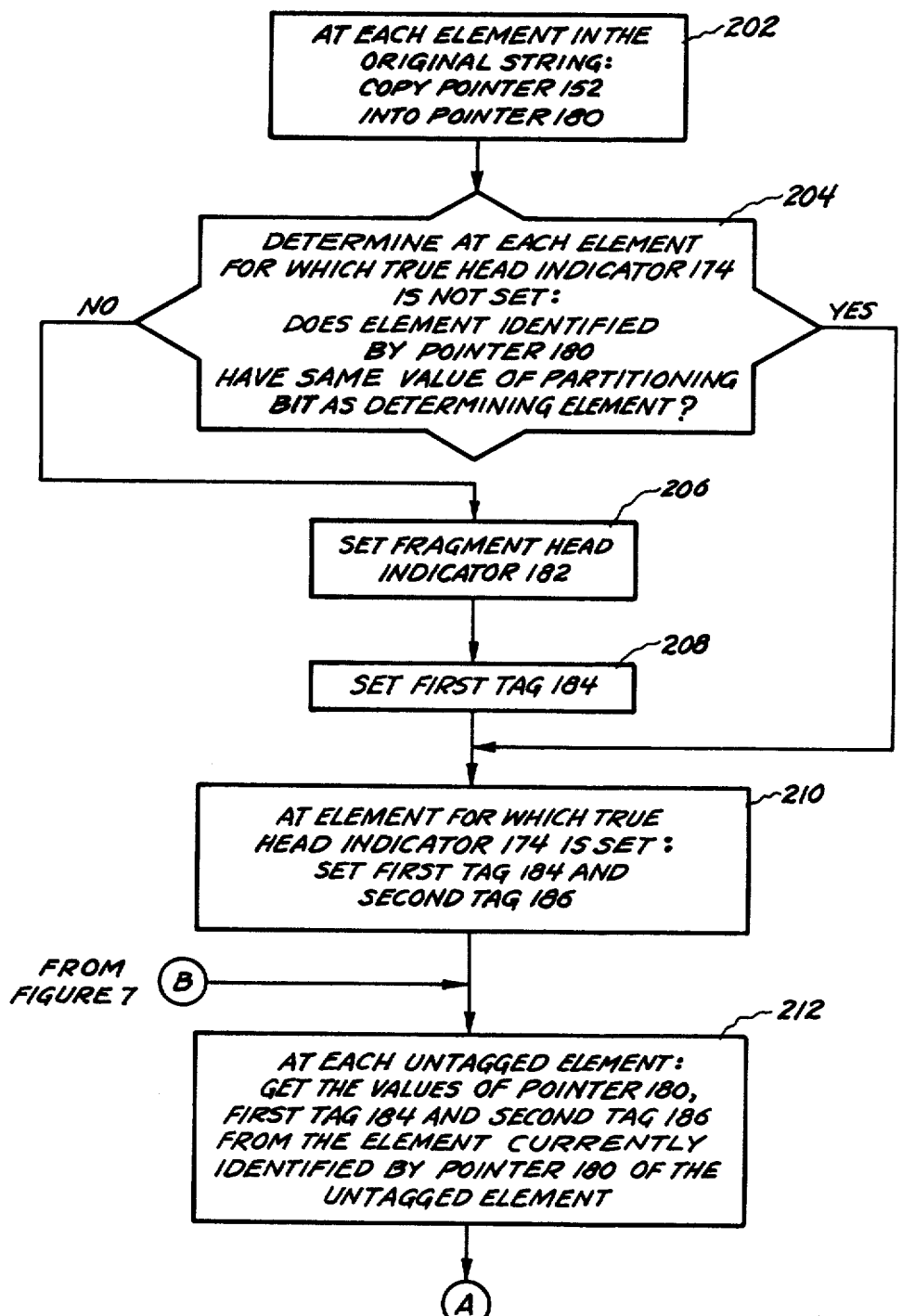
FIGS. 6 and 7 illustrate, in flowchart form, the steps required for data string partitioning, as described hereinbelow.
Figure 7:
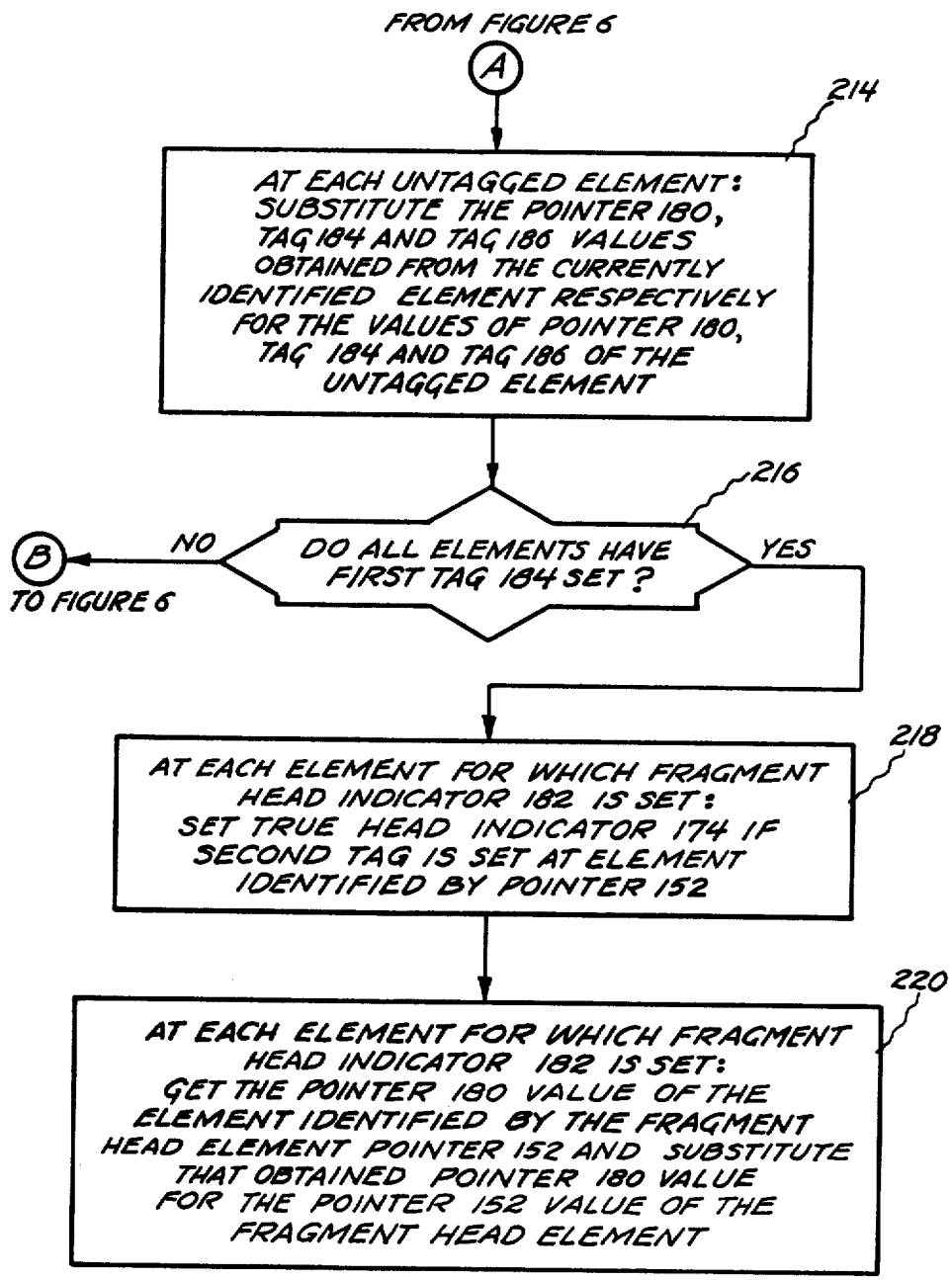

FIGS. 5a, 5b, 5c, 5d and 5e illustrate the successive steps of the partitioning method as practiced on data string 150. FIGS. 6 and 7 present the partitioning method in flowchart form. Referring to FIG. 5a, the processor identity and pixel value is listed for each data element. The remaining four columns are allocated to indicate the information contained in additional data portion 178 for each data element. Thus, those columns respectively indicate temporary pointer 180, fragment head indicator 182, first tag 184 and second tag 186. FIGS. 5b through 5e have the same column structure.

Referring also to FIG. 6, the illustrated embodiment of the partitioning method, shown in flowchart 200, commences with a step 202 for which at each element in the string or filament being partitioned, hereinafter referred as an original data string, the value of pointer 152 is copied into temporary pointer 180. FIG. 5a illustrates the performance of step 202. As described above, the processor for each element in string 150 carries pointer 152 which identifies the next, preceding element in the string. Then, as a result of performing step 202, temporary pointer 180 identifies for each data element the next, preceding element in data string 150. As is readily apparent to one skilled in the art, in practicing the method of the present invention on a distributed processing system, such as system 100, in order to execute step 202, instructions would be applied in parallel to all processors to copy the information stored at the memory address location corresponding to pointer 152 into the memory address location corresponding to pointer 180. Each subsequent step of the method as described hereinbelow is similarly executed on the distributed processing system by providing the same instruction in parallel (concurrently) to all processors. Note, however, that at many subsequent steps only certain processors actually carry out the provided instruction depending on the determination of a condition.

Referring again to FIG. 6, following step 202, a step 204 is performed in which it is determined at each element in the original string, except the true head element, if its value of the partitioning bit, which is the 1 sb of the pixel value here, is the same as the partitioning bit value of the element identified by pointer 180. As noted above, it is preferred herein that the identity of the partitioning bit within the pixel value field be specified by the main histogramming program. Note further that the performance of step 204 by a processor is subject to the condition that the true head indicator is not set for the data element stored thereby. That indicator should only be set for the element at processor P0. The required determination is accomplished by each processor reading the 1 sb of the pixel value at the processor identified by pointer 180. At this point in the method, pointer 180 of each element identifies the immediately preceding element in the original string. Thus, for step 202, it is determined for each element whether the immediately preceding element has the same partitioning bit value, i.e. pixel value 1 sb, as itself. If it is determined that the immediately preceding element does not have the same partitioning bit value, steps 206 and 208 are performed in which both fragment head indicator 182 and first tag 184 are respectively set for the element at which the determination was made. The results of performing steps 204, 206 and 208 are illustrated in FIG. 5b. Where it is determined at a first element that its partitioning bit value is different from that of a second, immediately preceding element, the first element is a head element of a fragment. For example, the elements at processors P4, P7 and P9 are respectively the head elements of fragments 192, 194 and 196 (FIG. 2b). This is indicated in FIG. 5b, as required by step 206, by setting fragment head indicator 182 for those elements (indicated by an "S"). First tag 184 is also set for the elements at processors P4, P7 and P9 in accordance with step 208, this also being indicated by an "S" for each of these elements.

Referring again to FIG. 6, following step 208 or if at step 204 it is determined that an element has the same partitioning bit value as its immediately preceding element, step 210 is performed. At step 210, first tag 184 and second tag 186 are set at the true head element of each original string being partitioned, i.e. at each element for which true head indicator 174 is set. The result of performing step 210 is also illustrated in FIG. 5b where "S"'s are listed for the element at processor P0 to indicate tags 184 and 186 are set.

Flowchart 200 continues, following step 210, with step 212 at which the processor for each untagged element, i.e. each element for which the first tag is not set, gets, by reading, the values of pointer 180, first tag 184 and second tag 186 from the element processor currently identified by pointer 180 of the untagged element. Then, at step 214 (FIG. 7), the untagged element processor substitutes, by writing, the values of pointer 180, first tag 184 and second tag 186 obtained (read) in step 212 respectively for its own pointer 180, first tag 184 and second tag 186. Upon commencing performance of step 212, the untagged/tagged status of each element is as shown in FIG. 5b. As can be seen, the elements at processor P1-P3, P5, P6, P8 and P10-P15 are untagged. As a result, the processor for each of these elements performs step 212.

The results of performing steps 212 and 214 are illustrated in FIG. 5c. As an example, with respect to the element at processor P5, the element currently identified by its pointer 180 is the element at processor P4. Therefore at step 212, processor P5 gets, by reading, from processor P4 the values of pointer 180 (which is P3), first tag 184 (set) and second tag 186 (unset). Then at step 214, processor P5 substitutes, by writing, the values obtained (read) from processor P4 in step 212 as the new values for its pointer 180, first tag 184 and second tag 186. This result is illustrated in FIG. 5c where for the element at processor P5, P3 is shown as the value of pointer 180 and tags 184 and 186 are respectively indicated as set and unset.

With respect to the element at processor P1 at the commencement of step 212, the element at processor P0 is the element currently identified by pointer 180 of the element at processor P1. As a result of performing steps 212 and 214, tags 184 and 186 are both set for the element at processor P1 (FIG. 5c). Also, since temporary pointer 180 at processor P0 is blank, processor P1 substitutes a blank value for its pointer 180.

Following completion of step 214, it is determined at step 216 (FIG. 7), whether all elements in the original string respectively have their first tag set. If not, then the method returns to step 212. In the case of string 150, it is necessary to repeat steps 212 and 214 since the elements at processors P2, P3, P6 and P11-P15 remain untagged (FIG. 5c). Steps 212 and 214 are therefore performed again for these untagged elements, the results being illustrated in FIG. 5d. As can be seen in FIG. 5d, first tag 184 remains unset for the element at processors P13, P14 and P15. The determination at step 216 is therefore determined in the negative and the method returns for a third performance of step 212 and 214. The results of the third performance of these steps is illustrated in FIG. 5e.

At this point, the condition at step 216 is satisfied and flowchart 200 continues with step 218 wherein true head indicator 174 is set for each fragment head element that determines second tag 186 is set for the element identified by pointer 152 of the fragment head element. As previously described, pointer 152 identifies the element immediately preceding the fragment head element in the original string. Referring again to FIG. 5e, the element at processor P4 is the only fragment head element whose pointer 152 identifies an element the second tag of which is set. As described above, step 210 (FIG. 6) operated to set the second tag at the true head element. Subsequent steps 212, 214 and 216, serve to pass the second tag down the string, i.e. in a direction away from the true head element, to the tail element of the fragment containing the true head element. As a result, the partitioning method disclosed herein assures that upon reaching step 218, the second tag is set at the tail element of the fragment containing the true head element. Then, in performing step 218, it is determined for the elements at processors P4, P7 and P9, each a fragment head element, whether second tag 186 is respectively set for the elements at processor P3, P6 and P8. The second tag is only found to be set for the element at processor P3. As a result, it is determined that the element at processor P4 is the true head element of one of the two filaments into which the original string, i.e. data string 150, is being partitioned. Therefore, the true head indicator is set for the element at processor P4. Note that the element at processor P0 is necessarily the true head element of the other filament, this being indicated by true head indicator 174.

A survey of FIG. 5e reveals that pointer 180 of each element immediately preceding a fragment head element identifies the tail element of the next fragment in the original string both closer to the true head element of the original string and composed of elements having the same value of the partitioning bit, i.e. the 1 sb, as the fragment head element. This result is a basic property of the present partitioning method. For example, the element at processor P8 is the immediately preceding element to the fragment head element at processor P9, for which 1 sb=1. Pointer 180 at processor P8 identifies processor P6 which stores the tail element of the next 1 sb=1 fragment in the original string. Following step 218, step 220 is performed in which the processor for each fragment head element gets (reads) the pointer 180 value from the immediately preceding element processor (i.e. the element processor identified by pointer 152) and substitutes (writes) the obtained pointer 180 value as its own new pointer 152 value. Thus, for each fragment head element, the pointer 180 value at the immediately preceding element is substituted as the new pointer 152 value of the fragment head element. In considering another example, pointer 152 of the element at processor P7 identifies the immediately preceding element at processor P6. The value of pointer 180 at processor P6, i.e. processor P3, is substituted as the new pointer 152 for the element at processor P7. Note that when step 220 is performed for the element at processor P4, that element gets a blank as pointer 180 of the immediately preceding element at processor P3. Thus, processor P4 substitutes a blank for pointer 152 in performing step 220, this being a correct result since the element at processor P4 is the true head element of a filament. Upon completion of step 220, pointer values 152 define the two filaments into which the original string is partitioned. These are the pointer 152 values illustrated in FIG. 2c. Note that the true head indicator is set for the true head element of each of these filaments.

It is further noted that filaments 154, 156 are not homogeneous filaments. It is necessary to partition on all bits of the pixel value to assure that the resulting filaments are homogeneous. Therefore, at this point in the histogramming method, the next more significant bit of the pixel value is specified as the partitioning bit. In the illustrated embodiment, the next more significant bit is the msb and filaments 154 and 156 are partitioned on this bit. Each filament 154, 156 is considered an original string upon which the partitioning method is practiced. Each filament is defined as an original string in terms of pointers 152 and true head indicator 174. Filaments 154, 156, as original strings, are partitioned in parallel and therefore concurrently. That is, the sequence of processor instructions corresponding to the partitioning method as described hereinabove and illustrated in flowchart 200 (FIGS. 6 and 7) are applied in parallel to the processors storing the elements comprising both filaments. The detailed intermediate results of practicing the partitioning method concurrently on filaments 154, 156 are not illustrated herein. The final results of that partitioning are illustrated in FIG. 2d. There it is seen that filament 154 has been partitioned into two homogeneous filaments 158 and 160 composed only of data elements having pixel values '00' and '10', respectively. Also, filament 156 has been partitioned into two homogeneous filaments 162 and 164 composed only of data elements having pixel values '01' and '11', respectively. In performing step 218, true head indicator 174, not illustrated in FIG. 2d, is set for the elements at processors P1 and P5, that indicator already being set for the elements at processors P0 and P4. Thus, the elements at processors P0, P1, P4 and P5 are respectively the true head elements of filaments 158, 160, 162 and 164.

In accordance with flowchart 200 (FIG. 3), having partitioned data string 150 into homogeneous filaments, step 128 is performed next in which the length of each filament is determined. The detailed steps by which the filament lengths are determined are described hereinbelow. A data structure 250 for each data element is illustrated in FIG. 8. Structure 250 includes permanent portion 172 described above with respect to the partitioning method and illustrated in FIG. 4. Thus, portion 172 is composed of true head indicator 174, pointer 152 and pixel value field 176. As was the case with data structure 170 (FIG. 4) formed for the practice of the partitioning method described hereinabove, data structure 250 includes an additional data portion 252 at each processor for each element. Data portion 252 "shadows" or "parallels" data portion 172 and its content is determined by the practice of the length determination method. It is noted that data portion 178 of data structure 170 need not be retained by the respective processors upon completion of step 106 (FIG. 3).

Referring again to data portion 252 illustrated in FIG. 8, that portion includes a temporary pointer 254 for carrying an element identity determined by the length determination method. As is the case with pointers 152 and 180 already described, pointer 254 may simply carry the identity of the processor which stores the element to be identified by the pointer. Portion 252 further includes a tag 256 the set/unset condition of which is used to determine whether an element processor performs certain steps of the length determination method. The additional data structure also includes a sequential position value field 258, the value of which is computed for each element by the length determination method. The sequential position value for each element is that element's sequential position within its respective filament. Data structure 250 additionally includes a tail element 260 which when set at an element indicates that the element is at the tail of the filament. Indicator 260 is initially unset since the tail element does not initially carry information identifying its position at the tail of its filament. As was the case with data structure 170, the status of indicators 256 and 260 as unset or set is determined by whether the indicator is represented by a first or a second predetermined bit such as '0' or '1', respectively. Also as in the case of data structure 170, the fields of data structures 250 are aligned in the respective processor memories to enable successful operation of the SIMD instruction format as described above.

Figure 9A:
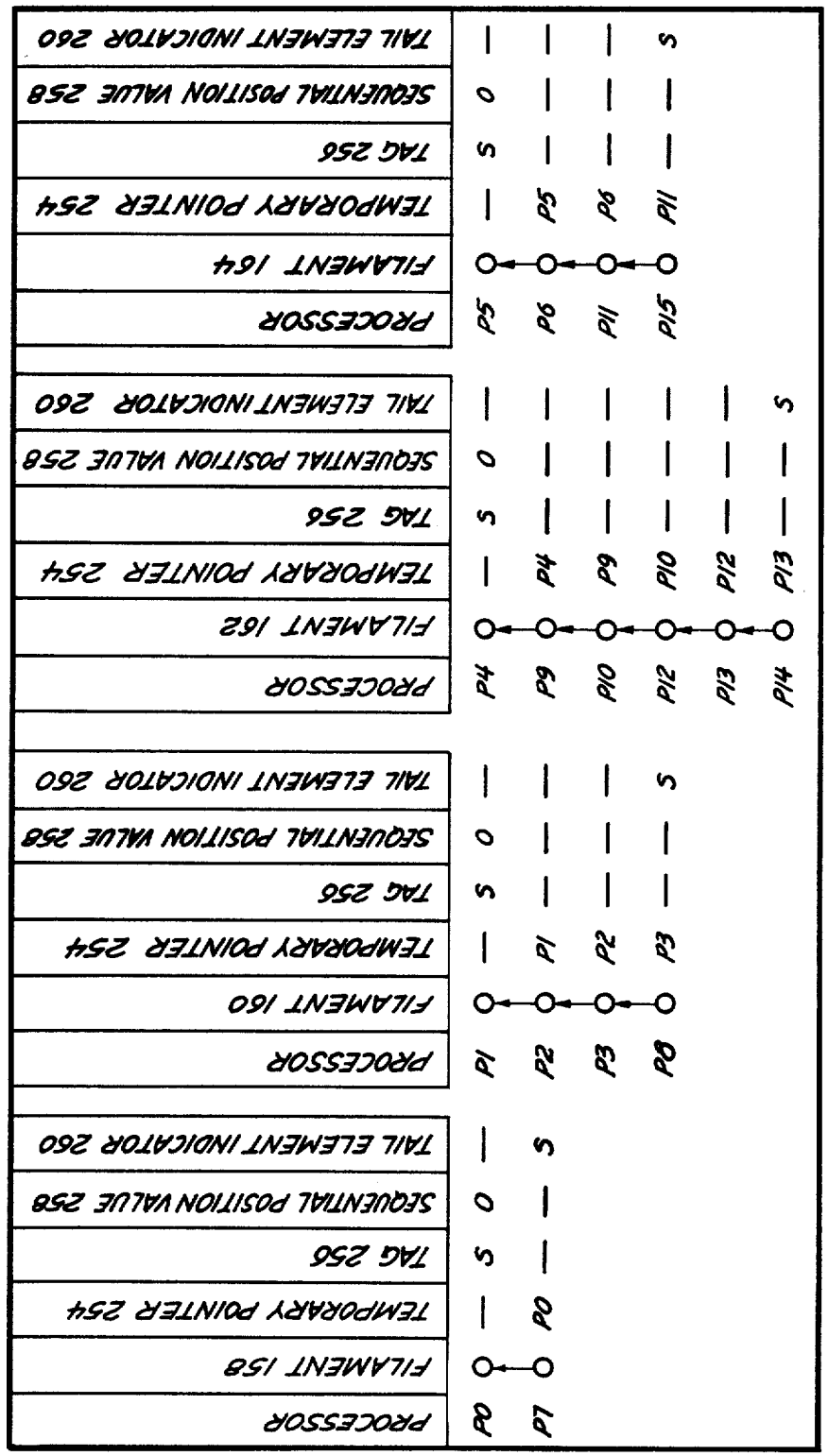

In essence, the length determination method disclosed herein assigns a sequential position value to each element in each filament the length of which is being determined. The position value zero is assigned to the true head element of each filament. The sequential position value of each filament element exceeds by one the sequential position value of the immediately preceding element, as identified by pointer 152. The method also requires identification of the tail element of each filament. Then when the sequential position value of a tail element is incremented by one, the result is the number of elements in, i.e. the length of, its filament. In the illustrated embodiment, the length of homogeneous filaments 158, 160, 162 and 164 will be determined in parallel, i.e. concurrently. The illustrated embodiment of the string length determination method is shown in FIGS. 9a-9f, 10 and 11. FIGS. 9a-9f illustrate the successive steps in determining the length of, i.e. number of elements in, filaments 158, 160, 162, 164, while FIGS. 10 and 11 represent the length determination method in flowchart form. Referring to FIG. 9a, four groups of columns are presented, each group providing information relevant to a different one of filaments 158, 160, 162 and 164. Each group of columns diagrammatically illustrates the filament and lists adjacent the elements the identities of the processors at which the filament elements are stored. Each group further lists adjacent each element, the information carried in data portion 252. Thus, there are columns for listing temporary pointer 254, tag 256, sequential position value 258 and tail element indicator 260. FIGS. 9b-9f have the same group and column structure.

Referring to FIG. 10, the illustrated embodiment of the string length determination method, shown in a flowchart 300, commences with a step 302 in which the element at the tail of each filament is identified and tail element indicator 260 is set at the tail element. One method for identifying the tail element is to have each processor, in the distributed processing system, that carries a data element in its memory, set a bit (a write operation) at a predetermined address location in the memory of the processor carrying the immediately preceding element in the filament. The preceding element in the filament is identified by pointer 152. The tail element will be the only element for which this bit is not set and will thereby be identified.

Next, at step 304, the value of pointer 152 is copied into temporary pointer 254 at all elements in each filament. Then, at the true head element of each filament, i.e. the only element having true head indicator 174 set, sequential position value 258 is set to '0' (step 306) and tag 256 is set (step 308). As noted above, the values of pointers 152 and 254 may simply be the identity of the processor whose memory stores the filament element intended to be identified by the pointer.

It is again noted that in practicing the length determination method on a SIMD type distributed processing system, each step of the method is performed by applying the same instructions to all processors in the system. For example, in order to execute step 304, each processor, irrespective of which filament it is associated with, is instructed to copy the information stored at the memory address location corresponding to pointer 152 into the memory address location corresponding to pointer 254. As in the case of the partitioning method, at some subsequent steps only certain elements actually carry out the provided instruction depending on the determination of a condition. For example, while instructions corresponding to steps 306 and 308 are applied to all processors, these steps are only performed at each processor that determines true head indicator 174 is set, i.e. the processors storing filament head elements.

The results of performing steps 302 through 308 are illustrated in FIG. 9a. An "S" in the tail element indicator 260 column for the elements at processor P7, P8, P14 and P15 indicates that indicator has been set for these elements (step 302). The pointer 254 values listed are identical to the pointer 152 values listed for the processors in FIG. 2d in accordance with step 304 which requires copying pointer 152 into pointer 254 for each element. Since the elements at processors P0, P1, P4 and P5 are the true head elements of their respective filaments, the sequential position value is indicated as '0' for each of these elements (step 306). Also, tag 256 is indicated as set, by an "S" for each of these elements (step 308).

Referring again to FIG. 10, flowchart 300 continues with step 310 in which a counter value "i" is set to '0'. The current value of the counter is preferably maintained by all processors carrying data elements. Next, at step 312, a determination is made whether tag 256 is set at each filament element, i.e. at all elements in all filaments. If it is not set at all elements, the method proceeds to step 314 in which a computed value is passed to each element in each filament for which tag 256 is not set, each such element being hereinafter referred to as a receiving element. The computed value which is passed is equal to $2^i+v$ where i is the current value of the counter and v is the sequential position value of a passing element identified by pointer 254 of the receiving element. The receiving element takes the computed value of $2^i+v$ as its sequential position value 258. Referring to FIG. 11 in which flowchart 300 continues with step 316, the value of tag 256 is copied from the passing element to the receiving element, as the latter element's tag 256. For performing step 316, the identities of the passing and receiving elements are as defined at step 314.

At the commencement of step 314, the status of the filament element is as shown in FIG. 9a. With respect to step 314, tag 256 is not set for the elements at processors' P7 (filament 158); P2, P3 and P8 (filament 160); P9, P10, P12, P13 and P14 (filament 162); and P6, P11 and P15 (filament 164). The elements at these processors are therefore receiving elements. The passing element corresponding to each receiving element is identified by pointer 254 of the latter element. For example, with respect to filament 162, for the receiving elements at processors P9, P10, P12, P13 and P14, the passing elements are respectively the elements at processors P4, P9, P10, P12 and P13. As can be seen, an element may be both a passing and receiving element. As an example, the element at processor P9 is considered as a receiving element. For computing $2^i+v$, the current value of i is '0' and v is equal to the sequential position value of the element at processor P4, which is '0'. Therefore, $2^i+v=1$. Also for the element at processor P9, in performing step 316, the set condition of tag 256 at processor P4 is copied at processor P9. It is noted that the sequential position value of certain elements is undetermined, i.e. blank, prior to commencing step 314. As a result, the computed $2^i+v$ sequential position value 258 for each receiving element, whose pointer 254 identifies such an element with an undetermined value 258, is not determinable. For example with respect to filament 162, prior to commencing step 314 the sequential position value is undetermined for the elements at processors P9, P10, P12 and P13. As a result, the computed sequential position value for the receiving elements at processors P10, P12, P13 and P14 that respectively correspond to the passing elements at processor P9, P10, P12 and P13, are not determinable. With respect to step 316 for such receiving elements, head indicator 256 is unset at the corresponding passing element and so an unset condition is copied.

The results of performing steps 314 and 316 are illustrated in FIG. 9b and so, for elements such as those stored at processors P10, P12, P13 and P14 for which the computed sequential position value is not determinable, blanks are shown for sequential position value 258. The blanks in the tag 256 column for such elements indicates the unset condition of tag 256 for these elements. With respect to the elements at processors P7 (filament 158), P2 (filament 160), P9 (filament 162) and P6 (filament 164), the computed value of $2^i+v$ $(=1)$ is indicated (step 314), as is the set condition ("S") of tag 256 (step 316).

With respect to steps 314 and 316, the terms "passing" and "receiving" are chosen to facilitate the description of step performance. It is important, however, to note that at the commencement of step 314, while the identity of each passing element is known at the processor for each receiving element via a pointer 254, the reverse is not true. As a result, step 314 is performed by each element processor first determining if it stores a receiving element on the basis of whether its tag 256 is not set. Then, each receiving element processor, by its pointer 254 identifies the corresponding passing element processor and can read the appropriate information from that passing element processor. The computation of $2^i+v$ is preferably performed by the processor associated with the receiving element though the computation could be performed by the passing element processor. Where the computation is performed by the receiving element processor, the value of "v" would of course be read from the passing element processor to enable the computation. In order to instead perform the computation at the passing element processor, the passing element processor would first have to be apprised that it carries a passing element. This could be accomplished by the receiving element processor writing both a flag indicator and the receiving element identity into the appropriate passing element processor. The computation result at the passing element processor could either be read and copied by the receiving element processor or written into the memory of the latter processor by the passing element processor.

Referring again to FIG. 11, the illustrated method continues with step 318 wherein the processor for each element for which tag 256 is not set, substitutes (writes) as a new value for its pointer 254, the pointer 254 value of the element currently identified by its pointer 254. The results of performing step 318 are illustrated in FIG. 9c, so that prior to performance of that step, pointer value 254 and tag 256 are as illustrated in FIG. 9b. As can be seen, for filament 160, step 318 is performed for the elements at processors P3 and P8; for filament 162, step 318 is performed for the elements at processors P10, P12, P13 and P14; and element processors P11 and P15 in filament 164 also perform step 318. That step is not performed for any elements in filament 158 since tag 256 is set for both elements of that filament. As an example of the performance of step 318, the elements of filament 164 are considered. As stated above, in accordance with the condition of tag 256 for the elements of filament 164, as shown in FIG. 9b. step 318 is performed for the elements at processors P11 and P15. Pointer 254 of the element at processor P11 currently identifies the element at processor P6. Pointer 254 of the currently identified element (at processor P6) identifies the element at processor P5. Processor P11 therefore substitutes (writes) for its pointer 254 the new value P5. Similarly, pointer 254 of the element at processor P15 identifies (FIG. 9b) the element at processor P11. Pointer 254 of the latter processor identifies the element at processor P6. Therefore P6 is substituted as the new pointer 254 value at processor P15. Note that since the filament structures as defined by data portion 172 are unaffected by the length determination method, pointers 152 and hence each filament structure remain unchanged.

Flowchart 300 (FIG. 11) continues with step 320 in which the counter value "i" is incremented from '0' to '1'. The method then returns to step 312 (FIG. 10) at which the determination is again made whether tag 256 is set for all filament elements. In the illustrated example, it is clear in FIG. 9c that tag 256 is not set for all elements in all filaments, i.e. it is not set for selected elements in filaments 160, 162 and 164. Therefore the method proceeds to a second performance of steps 314, 316 and 318, the results of which are illustrated in FIG. 9d. With respect to the performance of step 314 for filament 160, tag 256 is not set for the elements at processors P3 and P8. Since pointers 254 at processors P3 and P8 respectively identify processors P1 and P2, the elements at processors P3 and P8 are receiving elements for the passing element at processors P1 and P2. For the element at processor P3, $2^i + v = 2$ where $i = 1$ and $v = 0$. For the element at processor P8, $2^i + v = 3$ where $i = 1$ and $v = 1$. For step 316, each of these receiving elements copies a set tag 256 from its respective passing element. These results are illustrated in FIG. 9d.

With respect to the performance of steps 314 and 316 for filament 164, the elements at processor P11 and P15 are respectively receiving elements for the passing elements at processors P5 and P6. The results of performing steps 314 and 316 are substantially the same as described for filament 160 and those results are illustrated in FIG. 9d.

With respect to steps 314 and 316 for the elements of filament 162, the elements at processors P10, P12, P13 and P14 are receiving elements for passing elements at processors P4, P9, P10 and P12, respectively. Sequential position values of '2' and '3' are respectively computed for the elements at processors P10 and P12 (step 314). Also, a set tag 256 is copied for the elements at processors P10 and P12. At the commencement at step 314, for the receiving elements at processors P13 and P14, the respective passing elements at processors P10 and P12 have nondeterminable values of position value 258. As a result, an undetermined result is computed in performing step 314 for the elements at processors P13 and P14 and blanks are indicated in FIG. 9d for these elements. Additionally, processors P13 and P14 copy an unset head indicator in performing step 316. It is noted that steps 314 and 316 are not performed for any element in filament 158 since tag 256 is set for both elements of that filament.

Following the second performance of step 316, step 318 is reached and is only performed for the elements at processors P13 and P14 (filament 162) since these are the only two elements for which tag 256 is not set. The performance of step 318 is substantially as described above and the results of performing that step are illustrated in FIG. 9e. Processors P13 and P14 respectively substitute P4 and P9 as new pointer 254 values.

Following the second performance of step 318, step 320 is performed in which the counter is incremented from '1' to '2'. The method then returns to step 312 where it is determined that tag 256 is not set at all filament elements, since it is not set for the elements at processors P13 and P14 (FIG. 9e). Therefore, the method proceeds to a third performance of steps 314 and 316. At the commencement of step 314, since tag 256 of the elements at processors P13 and P14 are not set, these elements are receiving elements. Pointers 254 of the receiving elements at processors P13 and P14 respectively identify the passing element at processors P4 and P9. The computation of $2^i + v$ is performed for each receiving element in the manner described above. For example, with respect to the element at processor P13, the current counter value is '2', the sequential position value of the corresponding passing element at processor P4 is '0' and $2^i + v = 4$. This computed value is indicated in FIG. 9f which illustrates the results of the third performance of step 314, as well as step 316.

Referring again to FIG. 11, following completion of step 316, step 318 is reached. However, at this point, tag 256 is set at all elements so that this step is not performed. The method therefore proceeds to step 320 where the counter is incremented and then returns to step 312 (FIG. 10). At step 312, it is determined that tag 256 is set at each element in each filament (FIG. 9f) and the method therefore proceeds to step 322 (FIG. 11). At step 322, the sequential position value of the tail element of each filament is incremented by '1'. Thus, the processor for each element at which tail element indicator 260 is set, increments its sequential position value by '1'. The incremented position value result is the length of the filament with which the tail element is associated. Thus, the elements at processors P7, P8, P14 and P15 respectively determine the lengths of filaments 158, 160, 162 and 164 to be 2, 4, 6 and 4. This determination by the filament tail element processors completes filament length determination step 128 of flowchart 120 (FIG. 3).

The final step of the histogramming method of the present invention as illustrated in FIG. 3 is step 130. For that step, an instruction is provided the performance of which by an element processor is conditioned on tail element indicator 260 being set. That instruction requires each such tail element processor to write the incremented sequential position value into an output processor having an address identity equal to the pixel value of the tail element. For example, the tail element of filament 160 (at processor P8) has a pixel value of '10', i.e. '2' in decimal form. Therefore in performing step 130, processor P8 writes the incremented sequential position value '4' into a predetermined memory address location of processor P2. In like fashion, tail element processors P7, P14 and P15 each write the incremented sequential position value determined thereby into the predetermined memory address location of output processors P0, P1 and P3, respectively.

While the histogramming method of the present invention has been illustrated and described with respect to the processing of image data, the invention is not so limited. The method can be practiced, on a distributed processing system, on any group of data elements for which a histogram of respective data element values is desired.

With respect to the partitioning method described hereinabove, it is reiterated that the various bits of the pixel value need not be specified as the partitioning bit in any particular order to successfully effect the partitioning of a data string into homogeneous filaments.

With respect to the partitioning method described in flowchart 200, setting true head indicator 174 at each filament head element in step 218 and substitution of new values for pointers 152 at the fragment head elements in step 220 are steps effective to both form filaments and permanently abandon the structure of the original string. The invention is, however, not so limited. It is instead possible, if so desired, to maintain the original string structure by simply copying that structure into another memory location before initiating the partitioning method. In such a case, the element 172 structure would be copied at each processor into a predetermined address location of the processor's dedicated memory prior to partitioning.

At step 218 of flowchart 200 (FIG. 7) of the illustrated embodiment described hereinabove, the true head indicator was set at a fragment head element if the processor for that element determined the second tag was set at the immediately preceding element. Where, as preferred herein, the unset or set status of tags and indicators are indicated by presence of a '0' or '1' bit, respectively, a simpler means of performing step 218 is available. That step can simply be performed by each fragment head element processor substituting the second tag value of the immediately preceding element for its own (the fragment head element's) true head indicator. Thus, if the second tag is set at the immediately preceding element, a '1' bit will be carried there as that tag value. Then, the fragment head element processor would substitute that '1' bit as its own true head indicator, thereby setting its true head indicator, which is the desired result.

While the partitioning and length determination methods described hereinabove comprise a plurality of method steps presented in a sequence, the invention is not so limited. Some steps may be performed simultaneously with others where such steps do not depend on the results of performing previous steps. For example, with respect to the partitioning method, steps 206 and 208 of flowchart 200 (FIG. 6), which are performed by elements determined in step 204, can be performed simultaneously. As a further example, with respect to the length determination method, steps 306 and 308 of flowchart 300 (FIG. 10) which are both performed for each true head element, can be performed simultaneously. Generally, where such steps can be performed simultaneously, if it is instead desired to perform them sequentially, they need not be performed in the sequence illustrated and described hereinabove.

While, in the length determination method illustrated and described hereinabove, step 318 (FIG. 11) is performed only at elements for which tag 256 is not set, that method is not so limited. That step may instead be performed for each receiving element defined at the immediately preceding performance of step 314. It would then be necessary to identify the receiving elements, e.g. by setting an indicator, since their respective identities as such may otherwise be lost upon the copying of tags 256 at step 316. With respect to length determination, the length determination result is unaffected by performing step 314 with receiving elements.

In the practice of the histogramming method of the present invention as described hereinabove, the number of processors in the distributed processing system is greater than or equal to the number of data elements being processed. The invention is, however, not so limited. It will be apparent to those skilled in the art that by appropriately storing more than one data element at predetermined address locations in the memory of each processor, histogramming may be performed for a number of data elements greater than the number of processors.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. A method for determining the number of times each of a plurality of different element values occurs in a group of data elements, each said data element including one of said element values, said method comprising the steps of:
   (a) forming said group of data elements into a data string in which each said data element includes a first pointer identifying an immediately preceding element closer to a true head element in said data string;
   (b) partitioning said data string into a plurality of homogeneous filaments each composed only of said data elements having the same element value, so that there is only one of said element values corresponding to each said homogeneous filament; and
   (c) determining the number of said data elements composing each said homogeneous filament, the number of said data elements so determined for each said homogeneous filament being the number of times the element value corresponding to that homogeneous filament occurs.

2. The method of claim 1 wherein said element value for each said data element is expressed in binary form with the same bit length, a true head indicator being set at said true head element of said data string, step (b) of said method comprising the substeps of:
   (d) specifying a predetermined one of the bits of said element value as a partitioning bit, said data string being an original string composed of at least one string fragment, each said fragment being composed of a maximal continuous sequence of said data elements having the same value of said partitioning bit;
   (e) copying at all said data elements the value of said first pointer into a second pointer;
   (f) determining for all said data elements except said true head element if the immediately preceding element has the same value of said partitioning bit as itself;
   (g) setting a first tag at all said data elements for which it is determined in step (f) that the immediately preceding element does not have the same partitioning bit value as itself, each said data element having said first tag so set being a fragment head element;
   (h) setting said first tag and a second tag only at said true head element, each said data element having said first tag set or not set being respectively a tagged or untagged element;

(i) getting, for all said untagged elements, the values of said first and second tags and said second pointer from the data element currently identified by said second pointer of said untagged element;

(j) substituting, at all said untagged elements, the values of said first and second tags and said second pointer obtained in step (i) from said currently identified element respectively for said first and second tags and said second pointer of said untagged element;

(k) repeating steps (i) and (j) until all of said data elements in said original string are tagged;

(l) setting said true head indicator at each said fragment head element for which it is determined that said second tag is set at the immediately preceding element in said original string;

(m) getting, only for each said fragment head element, the value of said second pointer of said immediately preceding element in said original string and substituting the last recited second pointer value for the value of said first pointer of each said fragment head element, so that two filaments are formed each being defined by said first pointer at each said data element and said true head indicator being set at the data element at the head of each said filament; and (n) specifying as said partitioning bit a different one of the bits of said element value and repeating steps (e) through (m) unless all bits of said element value have been so specified, steps (e) through (m) being repeated with each said filament formed in the last performance of step (m) being said original string, step (b) being complete if all bits of said element value have been specified as said partitioning bit whereupon each said filament formed in the last performance of step (m) is homogeneous.

3. The method of claim 1, step (c) including the substeps of:

(d) identifying a tail element of each said homogeneous filament;

(e) assigning a sequential position value to each said data element in each said homogeneous filament, said true head element of each said homogeneous filament being assigned the sequential position value of zero, the sequential position value of each said data element exceeding by one the sequential position value of the data element identified by its first pointer; and (f) incrementing by one the sequential position value of each said tail element, the incremented position value of each said tail element being the number of said data elements composing the homogeneous filament with which said tail element is associated.

4. The method of claim 1, step (c) including the substeps of:

(d) identifying a tail element of each said homogeneous filament;

(e) copying said first pointer into a second pointer at each said data element;

(f) defining at each said true head element a sequential position value of zero;

(g) setting a tag at said true head element;

(h) setting a counter value at zero;

(i) determining if said tag is set at each said data element in each said homogeneous filament and, if so, proceeding to step (o) and, if not, proceeding to step (j);

(j) taking a value $2^i + v$ as the sequential position value at each said data element for which said tag is not set, each of the last recited data elements being a receiving element, where:

i = the current counter value; and v = the sequential position value of a passing element identified by said second pointer of said receiving element;

(k) copying at each said receiving element the tag of said passing element;

(l) determining, at each said data element for which said tag is not set, the data element currently identified by said second pointer of said determining element and substituting said second pointer of said currently identified data element for said second pointer of said determining element;

(m) incrementing by one said counter value;

(n) returning to step (i); and (o) incrementing by one said sequential position value of each said tail element, the incremented position value of each said tail element being the number of said data elements composing the homogeneous filament with which said tail element is associated.

5. The method of claim 2, step (c) including the substeps of:

(o) identifying a tail element of each said homogeneous filament;

(p) assigning a sequential position value to each said data element in each said homogeneous filament, said true head element of each said homogeneous filament being assigned the sequential position value of zero, the sequential position value of each said data element exceeding by one the sequential position value of the data element identified by its first pointer; and (q) incrementing by one the sequential position value of each said tail element, the incremented position value of each said tail element being the number of said data elements composing the homogeneous filament with which said tail element is associated.

6. A method for determining the number of times each of a plurality of different element values occurs in a group of data elements on a distributed processing system, each said data element including one of said element values, said processing system comprising a plurality of processors intercoupled to communicate with one another, each said processor comprising processing means for performing arithmetic and logic functions and memory means for storing information, said processing system being responsive to a single sequence of instructions applied in parallel to all of said processors, said method comprising the steps of:

(a) storing each said data element in the memory means of a different one of said processors;

(b) forming said group of data elements into a data string in which each said data element includes a first pointer identifying an immediately preceding element closer to a true head element in said data string;

(c) partitioning said data string into a plurality of homogeneous filaments each composed only of said data elements having the same element value, so that there is only one of said element values corresponding to each said homogeneous filament; and (d) determining the number of said data elements composing each said homogeneous filament, the number of said data elements so determined for each said homogeneous filament being the number of times the element value corresponding to that homogeneous filament occurs.

7. The method of claim 6, step (d) including the substeps of:

(e) identifying a tail element of each said homogeneous filament;

(f) assigning a sequential position value to each said data element in each said homogeneous filament, said true head element of each said homogeneous filament being assigned the sequential position value of zero, the sequential position value of each said data element exceeding by one the sequential position value of the data element identified by its first pointer; and (g) incrementing by one the sequential position value of each said tail element, the incremented position value of each said tail element being the number of said data elements composing the homogeneous filament with which said tail element is associated.

8. The method of claim 6, step (d) including the substeps of:

(e) identifying a tail element of each said homogeneous filament;

(f) copying said first pointer into a second pointer at each said data element:

(g) defining at each said true head element a sequential position value of zero;

(h) setting a tag at said true head element;

(i) setting a counter value at zero;

(j) determining if said tag is set at each said data element in each said homogeneous filament and, if so, proceeding to step (p) and, if not, proceeding to step (k);

(k) taking a value $2^i + v$ as the sequential position value at each said data element for which said tag is not set, each of the last recited data elements being a receiving element, where:
   i = the current counter value; and
   v = the sequential position value of a passing element identified by said second pointer of said receiving element;

(l) copying at each said receiving element the tag of said passing element;

(m) determining, at each said data element for which said tag is not set, the data element currently identified by said second pointer of said determining element and substituting said second pointer of said currently identified data element for said second pointer of said determining element;

(n) incrementing by one said counter value;

(o) returning to step (j); and (p) incrementing by one said sequential position value of each said tail element, the incremented position value of each said tail element being the number of said data elements composing the homogeneous filament with which said tail element is associated.

9. The method of claim 6 wherein said element value for each said data element is expressed in binary form with the same bit length, a true head indicator being set at said true head element of said data string, step (c) of said method comprising the substeps of:

(e) specifying a predetermined one of the bits of said element value as a partitioning bit, said data string being an original string composed of at least one string fragment, each said fragment being composed of a maximal continuous sequence of said data elements having the same value of said partitioning bit;

(f) copying at all said data elements the value of said first pointer into a second pointer;

(g) determining for all said data elements except said true head element if the immediately preceding element has the same value of said partitioning bit as itself;

(h) setting a first tag at all said data elements for which it is determined in step (g) that the immediately preceding element does not have the same partitioning bit value as itself, each said data element having said first tag so set being a fragment head element;

(i) setting said first tag and a second tag only at said true head element, each said data element having said first tag set or not set being respectively a tagged or untagged element;

(j) getting, for all said untagged elements, the values of said first and second tags and said second pointer from the data element currently identified by said second pointer of said untagged element;

(k) substituting, at all said untagged elements, the values of said first and second tags and said second pointer obtained in step (j) from said currently identified element respectively for said first and second tags and said second pointer of said untagged element;

(l) repeating steps (j) and (k) until all of said data elements in said original string are tagged;

(m) setting said true head indicator at each said fragment head element for which it is determined that said second tag is set at the immediately preceding element in said original string;

(n) getting, only for each said fragment head element, the value of said second pointer of said immediately preceding element in said original string and substituting the last recited second pointer value for the value of said first pointer of each said fragment head element, so that two filaments are formed each being defined by said first pointer at each said data element and said true head indicator being set at the data element at the head of each said filament; and (o) specifying as said partitioning bit a different one of the bits of said element value and repeating steps (f) through (n) unless all bits of said element value have been so specified, steps (f) through (n) being repeated with each said filament formed in the last performance of step (n) being said original string, step (c) being complete if all bits of said element value have been specified as said partitioning bit whereupon each said filament formed in the last performance of step (n) is homogeneous.

10. The method of claim 9, step (d) including the substeps of:

(p) identifying a tail element of each said homogeneous filament;

(q) assigning a sequential position value to each said data element in each said homogeneous filament, said true head element of each said homogeneous filament being assigned the sequential position value of zero, the sequential position value of each said data element exceeding by one the sequential position value of the data element identified by its first pointer; and (r) incrementing by one the sequential position value of each said tail element, the incremented position value of each said tail element being the number of said data elements composing the homogeneous filament with which said tail element is associated.

11. The method of claim 6 wherein the value of each said first pointer identifies the processor in whose memory means the data element identified by said first pointer is stored.

12. The method of claim 6 wherein said data elements are aligned in the respective memory means of said processors such that information comprising each said data element is stored at the same address location.

13. The method of claim 7 including the additional step, following step (g), of:
  transferring the incremented position value respectively from each said tail element to the processor having a numerical address identity equal to the element value of the transferring tail element.

14. Apparatus for determining the number of times each of a plurality of different element values occurs in a group of data elements, each said data element including one of said element values, said apparatus comprising distributed processing means for:
  (a) forming said group of data elements into a data string in which each said data element includes a first pointer identifying an immediately preceding element closer to a true head element in said data string;
  (b) partitioning said data string into a plurality of homogeneous filaments each composed only of said data elements having the same element value, so that there is only one of said element values corresponding to each said homogeneous filament; and
  (c) determining the number of said data elements composing each said homogeneous filament, the number of said data elements so determined for each said homogeneous filament being the number of times the element value corresponding to that homogeneous filament occurs.

15. The apparatus of claim 14, said number of data element determining means of said distributed processing means further comprising means for:
  (d) identifying a tail element of each said homogeneous filament;
  (e) assigning a sequential position value to each said data element in each said homogeneous filament, said true head element of each said homogeneous filament being assigned the sequential position value of zero, the sequential position value of each said data element exceeding by one the sequential position value of the data element identified by its first pointer; and
  (f) incrementing by one the sequential position value of each said tail element, the incremented position value of each said tail element being the number of said data elements composing the homogeneous filament with which said tail element is associated.

16. The apparatus of claim 14, said number of data element determining means of said distributed processing means further comprising means for:
  (d) identifying a tail element of each said homogeneous filament;
  (e) copying said first pointer into a second pointer at each said data element;
  (f) defining at each said true head element a sequential position value of zero;
  (g) setting a tag at said true head element;
  (h) setting a counter value at zero;
  (i) determining if said tag is set at each said data element in each said homogeneous filament and, if so, proceeding to (o) and, if not, proceeding to (j);
  (j) taking a value $2^i + v$ as the sequential position value at each said data element for which said tag is not set, each of the last recited data elements being a receiving element, where:
    i = the current counter value; and
    v = the sequential position value of a passing element identified by said second pointer of said receiving element;
  (k) copying at each said receiving element the tag of said passing element;
  (l) determining, at each said data element for which said tag is not set, the data element currently identified by said second pointer of said determining element and substituting said second pointer of said currently identified data element for said second pointer of said determining element;
  (m) incrementing by one said counter value;
  (n) returning to (i); and
  (o) incrementing by one said sequential position value of each said tail element, the incremented position value of each said tail element being the number of said data elements composing the homogeneous filament with which said tail element is associated.

17. The apparatus of claim 14 wherein said element value for each said data element is expressed in binary form with the same bit length, a true head indicator being set at said true head element of said data string, said data string partitioning means of said distributed processing means further comprising means for:
  (d) specifying a predetermined one of the bits of said element value as a partitioning bit, said data string being an original string composed of at least one string fragment, each said fragment being composed of a maximal continuous sequence of said data elements having the same value of said partitioning bit;
  (e) copying at all said data elements the value of said first pointer into a second pointer;
  (f) determining for all said data elements except said true head element if the immediately preceding element has the same value of said partitioning bit as itself;
  (g) setting a first tag at all said data elements for which it is determined in (f) that the immediately preceding element does not have the same partitioning bit value as itself, each said data element having said first tag so set being a fragment head element;
  (h) setting said first tag and a second tag only at said true head element, each said data element having said first tag set or not set being respectively a tagged or untagged element;
  (i) getting, for all said untagged elements, the values of said first and second tags and said second pointer from the data element currently identified by said second pointer of said untagged element;
  (j) substituting, at all said untagged elements, the values of said first and second tags and said second pointer obtained in (i) from said currently identified element respectively for said first and second tags and said second pointer of said untagged element;

(k) repeating (i) and (j) until all of said data elements in said original string are tagged;

(l) setting said true head indicator at each said fragment head element for which it is determined that said second tag is set at the immediately preceding element in said original string;

(m) getting, only for each said fragment head element, the value of said second pointer of said immediately preceding element in said original string and substituting the last recited second pointer value for the value of said first pointer of each said fragment head element, so that two filaments are formed each being defined by said first pointer at each said data element and said true head indicator being set at the data element at the head of each said filament; and (n) specifying as said partitioning bit a different one of the bits of said element value and repeating (e) through (m) unless all bits of said element value have been so specified, (e) through (m) being repeated with each said filament formed in the last performance of (m) being said original string, (b) being complete if all bits of said element value have been specified as said partitioning bit whereupon each said filament formed in the last performance of (m) is homogeneous.

18. The apparatus of claim 17, said number of data element determining means of said distributed processing means further comprising means for:

(o) identifying a tail element of each said homogeneous filament;

(p) assigning a sequential position value to each said data element in each said homogeneous filament, said true head element of each said homogeneous filament being assigned the sequential position value of zero, the sequential position value of each said data element exceeding by one the sequential position value of the data element identified by its first pointer; and (q) incrementing by one the sequential position value of each said tail element, the incremented position value of each said tail element being the number of said data elements composing the homogeneous filament with which said tail element is associated.

19. Apparatus for determining the number of times each of a plurality of different element values occurs in a group of data elements, each said data element including one of said element values, said apparatus comprising:

means for forming said group of data elements into a data string in which each said data element includes a first pointer identifying an immediately preceding element closer to a true head element in said data string;

means for partitioning said data string into a plurality of homogeneous filaments each composed only of said data elements having the same element value, so that there is only one of said element values corresponding to each said homogeneous filament; and means for determining the number of said data elements composing each said homogeneous filament, the number of said data elements so determined for each said homogeneous filament being the number of times the element value corresponding to that homogeneous filament occurs.

20. The apparatus of claim 19, said means for determining the number of said data elements further comprising:

means for identifying a tail element of each said homogeneous filament;

means for assigning a sequential position value to each said data element in each said homogeneous filament, said true head element of each said homogeneous filament being assigned the sequential position value of zero, the sequential position value of each said data element exceeding by one the sequential position value of the data element identified by its first pointer; and means for incrementing by one the sequential position value of each said tail element, the incremented position value of each said tail element being the number of said data elements composing the homogeneous filament with which said tail element is associated.

21. Apparatus for determining the number of times each of a plurality of different element values occurs in a group of data elements on a distributed processing system, each said data element including one of said element values, said processing system comprising a plurality of processors intercoupled to communicate with one another, each said processor comprising processing means for performing arithmetic and logic functions and memory means for storing information, said processing system being responsive to a single sequence of instructions applied in parallel to all of said processors, said distributed processing system being programmed to perform the steps of:

(a) storing each said data element in the memory means of a different one of said processors;

(b) forming said group of data elements into a data string in which each said data element includes a first pointer identifying an immediately preceding element closer to a true head element in said data string;

(c) partitioning said data string into a plurality of homogeneous filaments each composed only of said data elements having the same element value, so that there is only one of said element values corresponding to each said homogeneous filament; and (d) determining the number of said data elements composing each said homogeneous filament, the number of said data elements so determined for each said homogeneous filament being the number of times the element value corresponding to that homogeneous filament occurs.

22. The apparatus of claim 21, said distributed processing system being further programmed to perform the substeps, of step (d), of:

(e) identifying a tail element of each said homogeneous filament;

(f) assigning a sequential position value to each said data element in each said homogeneous filament, said true head element of each said homogeneous filament being assigned the sequential position value of zero, the sequential position value of each said data element exceeding by one the sequential position value of the data element identified by its first pointer; and (g) incrementing by one the sequential position value of each said tail element, the incremented position value of each said tail element being the number of said data elements composing the homogeneous filament with which said tail element is associated.

23. The apparatus of claim 21, said distributed processing system being further programmed to perform the substeps, of step (d), of:
(e) identifying a tail element of each said homogeneous filament;
(f) copying said first pointer into a second pointer at each said data element;
(g) defining at each said true head element a sequential position value of zero;
(h) setting a tag at said true head element;
(i) setting a counter value at zero;
(j) determining if said tag is set at each said data element in each said homogeneous filament and, if so, proceeding to step (p) and, if not, proceeding to step (k);
(k) taking a value $2^i + v$ as the sequential position value at each said data element for which said tag is not set, each of the last recited data elements being a receiving element, where:
i = the current counter value; and
v = the sequential position value of a passing element identified by said second pointer of said receiving element;
(l) copying at each said receiving element the passing element;
(m) determining, at each said data element for which said tag is not set, the data element currently identified by said second pointer of said determining element and substituting said second pointer of said currently identified data element for said second pointer of said determining element;
(n) incrementing by one said counter value;
(o) returning to step (j); and
(p) incrementing by one said sequential position value of each said tail element, the incremented position value of each said tail element being the number of said data elements composing the homogeneous filament with which said tail element is associated.

24. The apparatus of claim 21 wherein said element value for each said data element is expressed in binary form with the same bit length, a true head indicator being set at said true head element of said data string, said distributed processing system being further programmed to perform the substeps, of step (c), of:
(e) specifying a predetermined one of the bits of said element value as a partitioning bit, said data string being an original string composed of at least one string fragment, each said fragment being composed of a maximal continuous sequence of said data elements having the same value of said partitioning bit;
(f) copying at all said data elements the value of said first pointer into a second pointer;
(g) determining for all said data elements except said true head element if the immediately preceding element has the same value of said partitioning bit as itself;
(h) setting a first tag at all said data elements for which it is determined in step (g) that the immediately preceding element does not have the same partitioning bit value as itself, each said data element having said first tag so set being a fragment head element;
(i) setting said first tag and a second tag only at said true head element, each said data element having said first tag set or not set being respectively a tagged or untagged element;
(j) getting, for all said untagged elements, the values of said first and second tags and said second pointer from the data element currently identified by said second pointer of said untagged element;
(k) substituting, at all said untagged elements, the values of said first and second tags and said second pointer obtained in step (j) from said currently identified element respectively for said first and second tags and said second pointer of said untagged element;
(l) repeating steps (j) and (k) until all of said data elements in said original string are tagged;
(m) setting said true head indicator at each said fragment head element for which it is determined that said second tag is set at the immediately preceding element in said original string;
(n) getting, only for each said fragment head element, the value of said second pointer of said immediately preceding element in said original string and substituting the last recited second pointer value for the value of said first pointer of each said fragment head element, so that two filaments are formed each being defined by said first pointer at each said data element and said true head indicator being set at the data element at the head of each said filament; and
(o) specifying as said partitioning bit a different one of the bits of said element value and repeating steps (f) through (n) unless all bits of said element value have been so specified, steps (f) through (n) being repeated with each said filament formed in the last performance of step (n) being said original string, step (c) being complete if all bits of said element value have been specified as said partitioning bit whereupon each said filament formed in the last performance of step (n) is homogeneous.

25. The apparatus of claim 24, said distributed processing system being programmed to perform the substeps, of step (d), of:
(p) identifying a tail element of each said homogeneous filament;
(q) assigning a sequential position value to each said data element in each said homogeneous filament, said true head element of each said homogeneous filament being assigned the sequential position value of zero, the sequential position value of each said data element exceeding by one the sequential position value of the data element identified by its first pointer; and
(r) incrementing by one the sequential position value of each said tail element, the incremented position value of each said tail element being the number of said data elements composing the homogeneous filament with which said tail element is associated.

26. The apparatus of claim 22, said distributed processing system being programmed to perform the additional step, following step (g), of:
transferring the incremented position value respectively from each said tail element to the processor having a numerical address identity equal to the element value of the transferring tail element.

* * * * *